US010073878B1

(12) United States Patent
Han et al.

(10) Patent No.: US 10,073,878 B1
(45) Date of Patent: Sep. 11, 2018

(54) DISTRIBUTED DEDUPLICATION STORAGE SYSTEM WITH MESSAGING

(71) Applicant: SK hynix Inc., Gyeonggi-do OT (KR)

(72) Inventors: Hwansoo Han, Cupertino, CA (US); Zhenchuan Chai, Milpitas, CA (US); Tae Il Um, San Jose, CA (US)

(73) Assignee: SK Hynix Inc., Gyeonggi-do (KR)

( * ) Notice: Subject to any disclaimer, the term of this patent is extended or adjusted under 35 U.S.C. 154(b) by 547 days.

(21) Appl. No.: 14/694,644

(22) Filed: Apr. 23, 2015

Related U.S. Application Data

(60) Provisional application No. 62/099,927, filed on Jan. 5, 2015.

(51) Int. Cl.
*G06F 7/00* (2006.01)
*G06F 17/00* (2006.01)
*G06F 17/30* (2006.01)
*G06F 3/06* (2006.01)

(52) U.S. Cl.
CPC ........ *G06F 17/30371* (2013.01); *G06F 3/067* (2013.01); *G06F 3/0619* (2013.01); *G06F 3/0652* (2013.01); *G06F 17/30952* (2013.01)

(58) Field of Classification Search
CPC ......... G06F 17/30156; G06F 17/30327; G06F 17/30097; G06F 17/30371; G06F 17/30952; G06F 3/0619; G06F 3/0652
USPC .............................. 707/622, 692, 999.2, 809
See application file for complete search history.

(56) References Cited

U.S. PATENT DOCUMENTS

| 2008/0244204 | A1* | 10/2008 | Cremelie | G06F 11/2097 |
| | | | | 711/162 |
| 2008/0294696 | A1* | 11/2008 | Frandzel | G06F 3/0608 |
| 2014/0358872 | A1  | 12/2014 | Shin et al. | |
| 2016/0188211 | A1* | 6/2016  | Song | G06F 3/0631 |
| | | | | 711/114 |
| 2017/0300266 | A1* | 10/2017 | Wang | G06F 3/0641 |

OTHER PUBLICATIONS

Mun-Seok Noh, "Related Art Search Report", SNK Patent Law Office, Dec. 2014.

* cited by examiner

*Primary Examiner* — Md I Uddin
(74) *Attorney, Agent, or Firm* — IP & T Group LLP

(57) ABSTRACT

Receiving, at a storage array controller, a write instruction that includes a logical address and write data. Using the storage array controller to generate a fingerprint from the write data and sending, from the storage array controller to one or more recipient storage devices, a query that includes the fingerprint, wherein the query asks the recipient storage devices if the fingerprint is stored on any of the recipient storage devices.

21 Claims, 23 Drawing Sheets

DISTRIBUTED DEDUPLICATION STORAGE SYSTEM WITH MESSAGING

CROSS REFERENCE TO OTHER APPLICATIONS

This application claims priority to U.S. Provisional Patent Application No. 62/099,927 entitled SCALABLE DISTRIBUTED DEDUPLICATION FOR STORAGE ARRAY filed Jan. 5, 2015 which is incorporated herein by reference for all purposes.

BACKGROUND OF THE INVENTION

In deduplication storage systems, duplicate data is identified so that ideally only a single copy of the data is actually stored. Later copies of the duplicate data merely reference or otherwise point to the already-stored data so that duplicates of the same piece of data are not stored. Although deduplication storage systems exist, new deduplication storage systems which are easy to expand, but do not significantly compromise on the amount of storage saved by deduplication, would be desirable.

BRIEF DESCRIPTION OF THE DRAWINGS

Various embodiments of the invention are disclosed in the following detailed description and the accompanying drawings.

DETAILED DESCRIPTION

Figure 1:
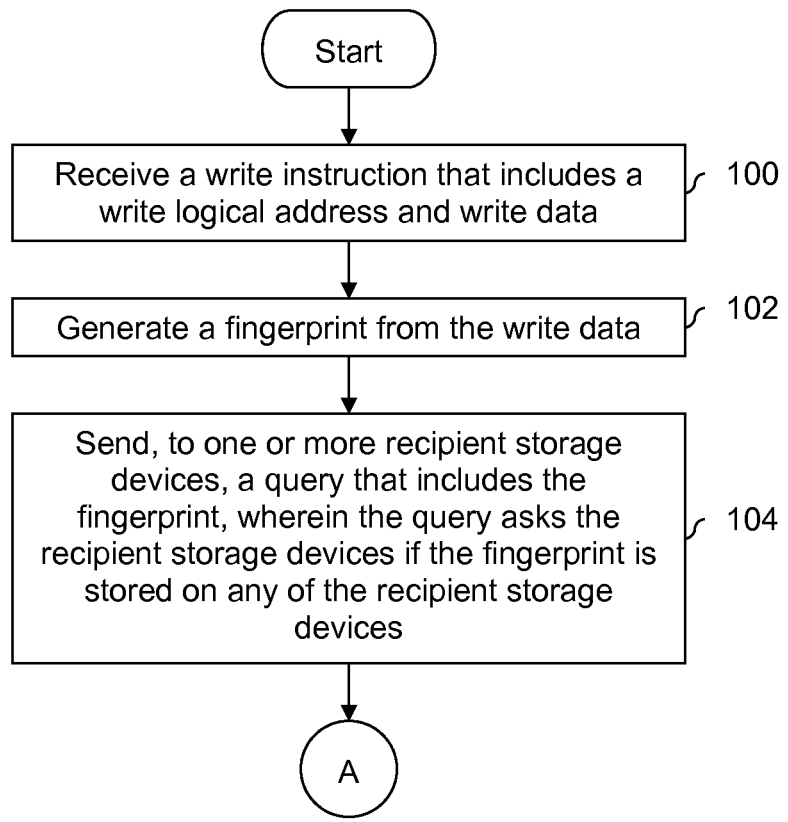
FIG. 1 is a flowchart illustrating an embodiment of a deduplication write process performed by a storage array controller.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Various embodiments of a deduplication storage system which uses one or more queries to identify which storage devices (if any) have a fingerprint stored thereon are disclosed. The fingerprint is generated from write data that is included in a write instruction (e.g., received at a storage array controller from a host) and is used to identify duplicate data that is already stored. A benefit to this type of deduplication storage system (various embodiments of which are described herein) is that the system is easily expandable while also optimizing the amount of duplicate data recognized by the system. For example, if an additional storage device is added to the system, it would not be necessary to bring down the storage array controller or any of the other storage devices. Another benefit is that the deduplication storage system described herein is able to recognize all pieces of duplicate data that have already been stored. In contrast, some other deduplication storage systems have good deduplication performance (e.g., if sent the same pieces of data, they consistently and correctly identify those pieces of data as copies of an already-stored version and do not store a duplicate copy), but cannot be easily expanded. Or, some other deduplication systems can be easily expanded but have lower deduplication performance (e.g., if sent the same pieces of data, they do not consistently identify those pieces of data as copies of an already-stored version and sometimes store a duplicate copy). In contrast, the deduplication storage system described herein is easily expandable with good deduplication performance.

FIG. 1 is a flowchart illustrating an embodiment of a deduplication write process performed by a storage array controller. In some embodiments, the process is performed by a storage array controller which communicates with and/or manages storage of data in a plurality of storage devices, such as a plurality of solid state storage devices (e.g., Flash, including a Flash array). In some embodiments, the process is performed by a semiconductor device, such as an application-specific integrated circuit (ASIC) or a field-programmable gate array (FPGA).

At 100, a write instruction is received that includes a write logical address and write data. For example, the write instruction may be sent from a host to a storage array controller. In some embodiments, the write logical address comprises a logical block address. In some embodiments, the write logical address is a logical address used by a host and in such embodiments may also be referred to as a host logical address.

At 102, a fingerprint is generated from the write data. In some embodiments, a fingerprint is generated using a hash function. For example if the write data is X, then the fingerprint generated at step 102 may be Hash(X).

In some embodiments, step 102 includes dividing the write data up into multiple chunks (sometimes referred to as "chunking") and performing a hash function on each of the chunks which produces multiple fingerprints. Any appropriate chunking and/or hash technique may be used in combination with the techniques described herein. For brevity and clarity, chunking and hashing are not described in embodiments herein. However, such configurations are not intended to be limiting.

At 104, a query that includes the fingerprint is sent to one or more recipient storage devices, where the query asks the recipient storage devices if the fingerprint is stored on any of the recipient storage devices. In deduplication storage, a fingerprint tends to be smaller than its corresponding write data, and so each of the plurality of storage devices keeps a fingerprint table with fingerprints for which the corresponding write data is stored on that storage device. As such, queries that are sent from the storage array controller to the storage devices include fingerprints as opposed to the write data itself. Although the write data itself could be sent from the storage array controller to the storage devices, the query would be larger and the storage devices would still have to generate the fingerprint from the write data in order to search the fingerprint table. Similarly, although the storage device itself could be directly searched for the write data, this would be very time consuming and searching through a fingerprint table (which is typically much smaller) is faster.

In various embodiments, various types of queries are sent at 104. For example, a single, broadcasted query may be sent to all storage devices. Alternatively, multiple, individual queries (e.g., each of which has a unicast destination address directed to a particular storage device) may be sent to the plurality of storage devices. Some more detailed examples are described below.

Figure 2:
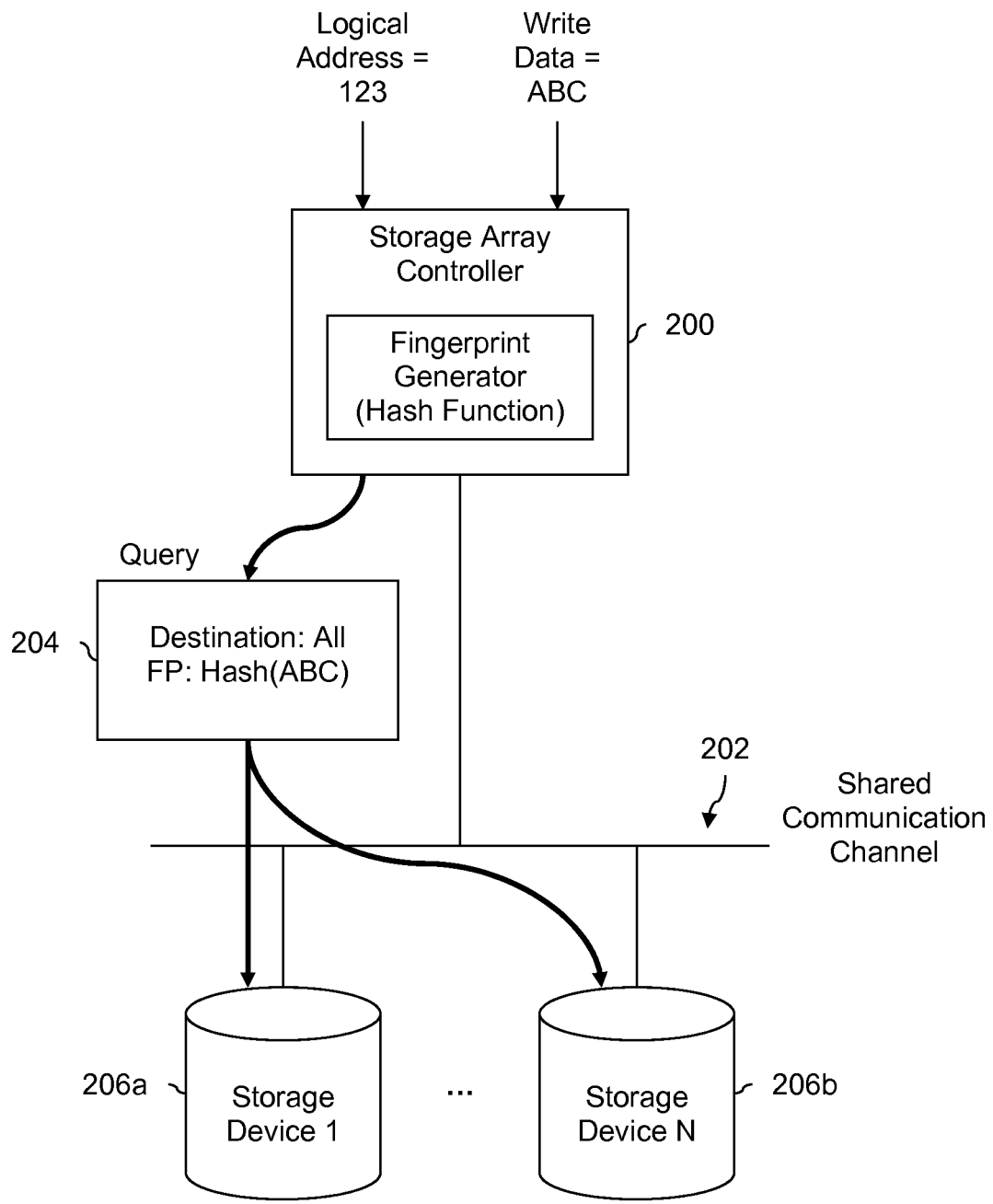
FIG. 2 is a diagram illustrating an embodiment of a deduplication storage system in which a broadcasted query is sent over a shared communication channel.

FIG. 2 is a diagram illustrating an embodiment of a deduplication storage system in which a broadcasted query is sent over a shared communication channel. Storage array controller 200 is one example of a device which performs the process of FIG. 1. In some embodiments, storage array controller 200 is a semiconductor device (e.g., an ASIC or an FPGA), as are each of storage devices 206a-206b.

In the example shown, storage array controller 200 receives a logical address of 123 and write data of ABC associated with a write instruction. In this example, storage array controller 200 generates a fingerprint by performing a hash of the write data in order to obtain a fingerprint of Hash(ABC).

Storage array controller 200 assembles query 204 and transmits it to storage devices 206a-206b via shared communication channel 202. For example, shared communication channel 202 may comprise a shared bus, where a single message output by storage array controller 200 is observable by each of the storage devices 206a-206b. Each of the storage devices 206a-206b uses the destination address or field in received communications to determine which communications to evaluate or process and which communications to ignore.

In this example, query 204 is a broadcasted query, where the query is directed to all possible destinations (i.e., all possible storage devices). For example, in networking, a broadcast address typically comprises all 1s in binary or all Fs in hexadecimal. In some embodiments, a group address may be used where storage devices 206a-206b are all members of the group.

Each of storage devices 206a-206b will evaluate the received query 204 since the destination is set to All. Query 204 includes the fingerprint generated from the received write data (i.e., Hash(ABC)). As a result, each of storage devices 206a-206b will search its respective fingerprint table (not shown) to determine if that fingerprint is stored.

A broadcasted query (such as the one shown herein) permits storage array controller 200 to generate and transmit a single query which will be processed by all of storage devices 206a-206b. In some embodiments, a broadcasted query is desirable because it minimizes the amount of bandwidth associated with shared communication channel 202 that is consumed.

Figure 3:
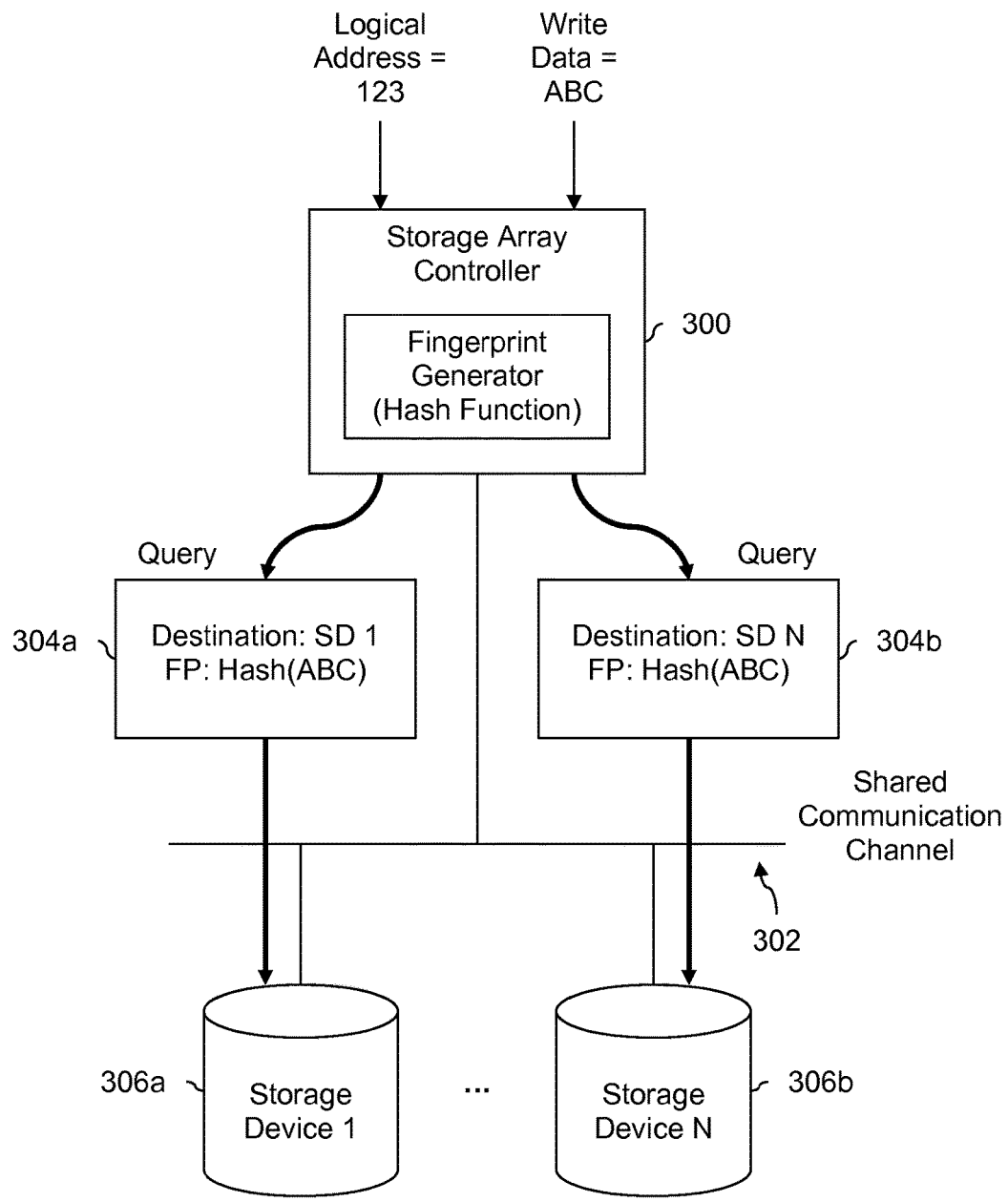
FIG. 3 is a diagram illustrating an embodiment of a deduplication storage system in which directed queries are sent over a shared communication channel.

FIG. 3 is a diagram illustrating an embodiment of a deduplication storage system in which directed queries are sent over a shared communication channel. In the example shown, the system has a shared communication channel (302), similar to the system shown in FIG. 2. However, in this example, storage array controller 300 is configured to send multiple, directed queries to storage devices 306a-306b. For example, the destination field in query 304a indicates that the query is directed to storage device 1 (306a). In some embodiments, a unicast address associated with a specific storage device is used in the destination field. Thus, although storage device N (306b) observes query 304a on shared communication channel 302, storage device N (306b) and all other storage devices (not shown) will ignore that query.

Similarly, query 304b lists storage device N (306b) as its destination, and so storage device 1 (306a) and all other storage devices (not shown) will ignore query 304b. Storage device 1 (306a) will thus process and respond to query 304a and storage device N (306b) will process and respond to query 304b.

Figure 4:
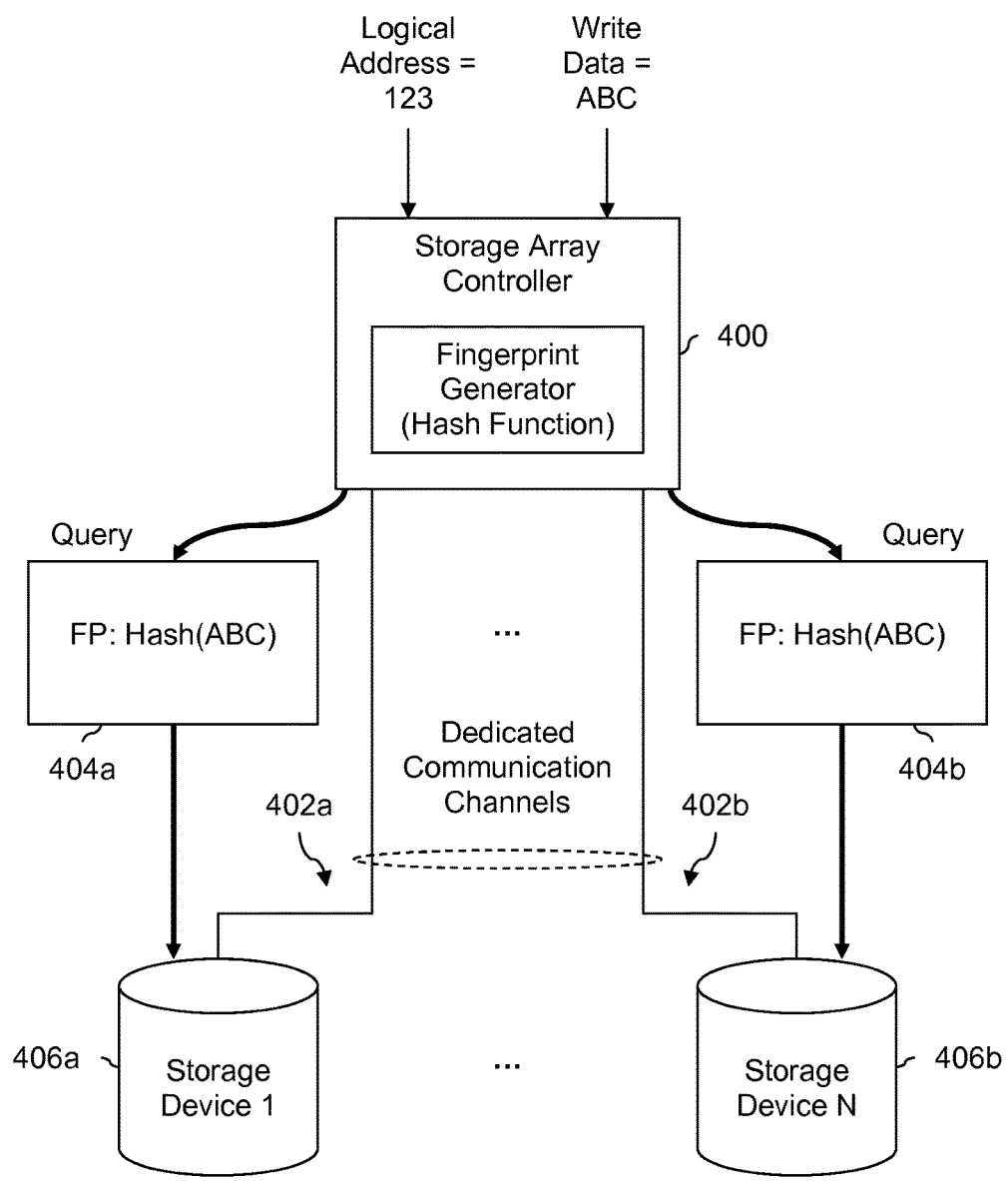
FIG. 4 is a diagram illustrating an embodiment of a deduplication storage system in which directed queries are sent over dedicated communication channels.

FIG. 4 is a diagram illustrating an embodiment of a deduplication storage system in which directed queries are sent over dedicated communication channels. In this example, storage array controller 400 has a dedicated communication channel with each of storage devices 406a-406b. Thus, storage device N (406b) will not be able to observe communications that are exchanged between storage array controller 400 and storage device 1 (406a) and vice versa. Query 404a is sent to storage device 1 (406a) via dedicated communication channel 402a and query 404b is sent to storage device N (406b) via dedicated communication channel 402b. Since dedicated communication channels are used, queries 404a and 404b (at least in this example) do not include a destination field since there is only one storage device being communicated with per channel.

FIG. 1 describes a process for generating and transmitting a query where the process is performed by a storage controller. The following figures describe various examples of the responses generated by and transmitted by (e.g., if/when appropriate) a storage device (e.g., in response to the process of FIG. 1).

Figure 5:
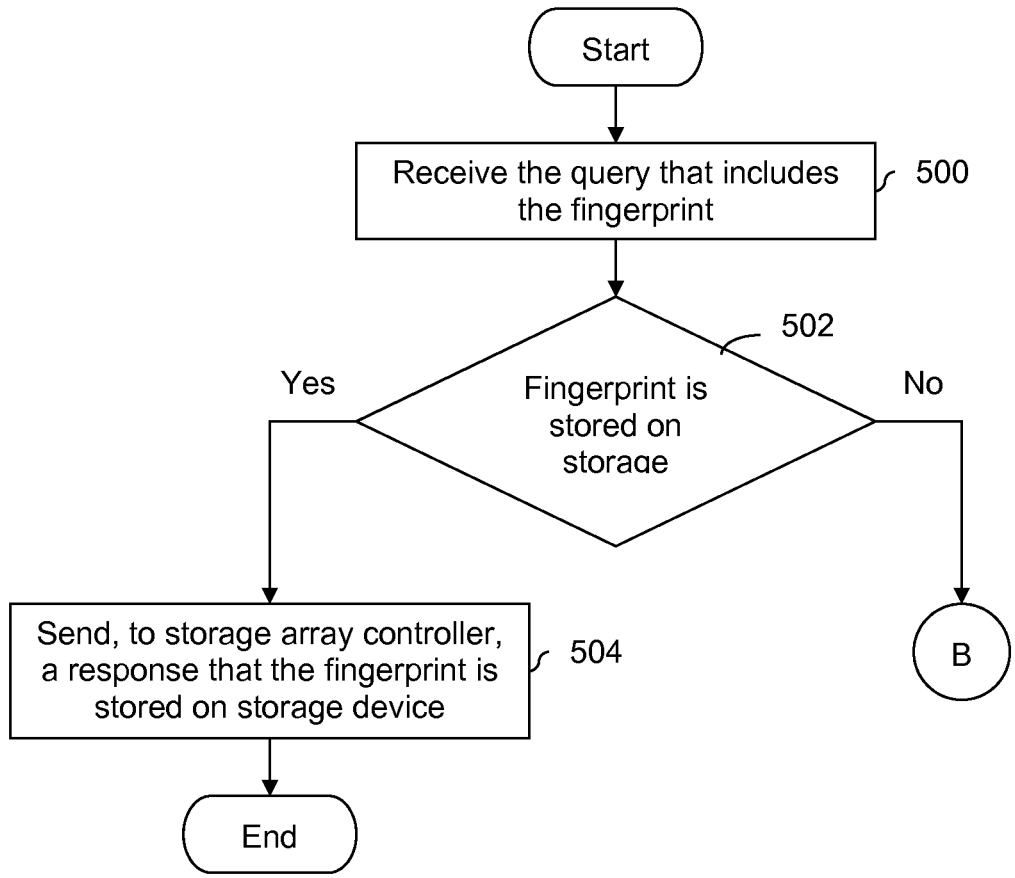
FIG. 5 is a flowchart illustrating an embodiment of a response process performed by a storage device during a deduplication write.

FIG. 5 is a flowchart illustrating an embodiment of a response process performed by a storage device during a deduplication write. In the example shown, the process is performed by a storage device, such as storage device 206a or 206b in FIG. 2, storage device 306a or 306b in FIG. 3, or storage device 406a or 406b in FIG. 4.

At 500, the query is received that includes the fingerprint. Returning to FIG. 1, the query that is sent at 104 (i.e., by the storage array controller) is the query that is received at 500 (i.e., by the storage device). As described above, the query received at 500 may be a broadcasted query (see, e.g., FIG. 2) or a directed query (see, e.g., FIGS. 3 and 4).

At 502, it is determined if the fingerprint is stored on the storage device. For example, each storage device in the plurality of storage devices may manage a fingerprint table in which fingerprints are stored for which the corresponding (write) data is stored in that storage device.

If the fingerprint is determined to be stored on the storage device at 502, then at 504 a response is sent to the storage array controller that the fingerprint is stored on the storage device. In various embodiments, the response may include the fingerprint being responded to and/or an identifier associated with the sending storage device. Some more detailed examples of responses are described below.

In various embodiments, a storage device may operate in a variety of ways in the event the fingerprint is determined not to be stored on a storage device at step 502. First, some active response embodiments are described where the storage device actively sends a response indicating that the fingerprint of interest is not sent by the responding storage device. Then, some passive response embodiments are described where a storage device remains silent and the storage device does not store the fingerprint of interest.

Figure 6:
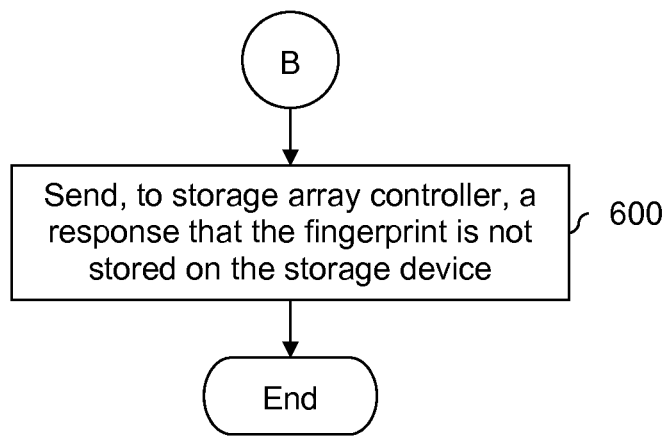
FIG. 6 is a flowchart illustrating an embodiment of an active response process performed by a storage device in the event a fingerprint is not stored by that storage device.

FIG. 6 is a flowchart illustrating an embodiment of an active response process performed by a storage device in the event a fingerprint is not stored by that storage device. FIG. 6 shows one example of how FIG. 5 may be continued if the decision at step 502 in FIG. 5 is No. At 600, a response is sent to the storage array controller that the fingerprint is not stored on the storage device. The following figure shows an example of this.

Figure 7:
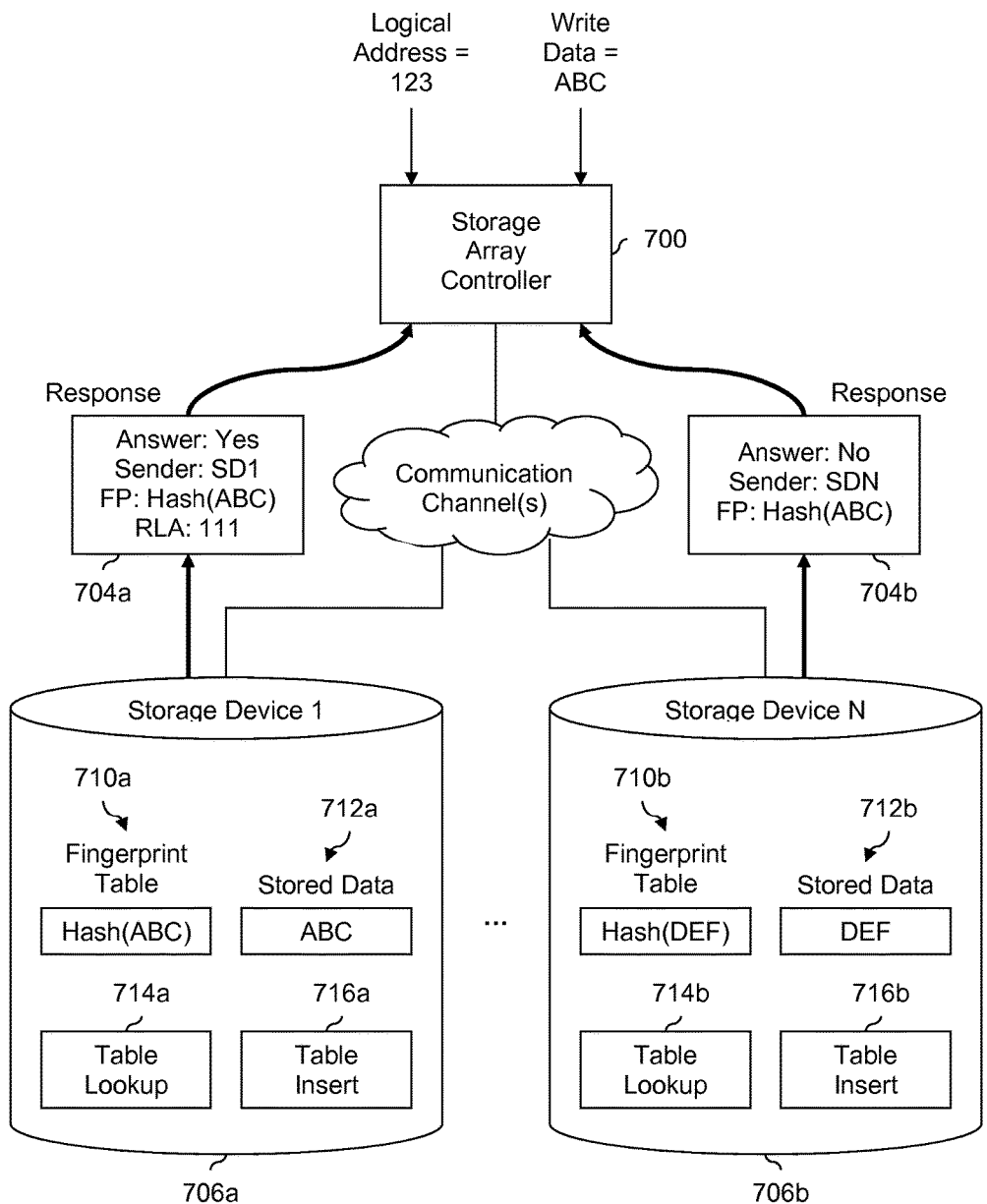
FIG. 7 is a diagram illustrating an embodiment of a deduplication storage system in which active responses are sent in the event a fingerprint is not stored by a storage device.

FIG. 7 is a diagram illustrating an embodiment of a deduplication storage system in which active responses are sent in the event a fingerprint is not stored by a storage device. In the example shown, a query (not shown) has already been sent to storage devices 706a-706b asking if a fingerprint of Hash(ABC) is stored by the storage devices since a write data value of ABC was received by storage array controller 700. For simplicity, a generic communication channel is shown between storage array controller 700 and storage devices 706a-706b. Naturally, in various embodiments a single, shared communication channel or multiple dedicated communication channels may be used (as described above).

Each of the storage devices shown manages a fingerprint table which is used to store fingerprints corresponding to data which is stored on that particular storage device. For example, storage device 1 (706a) stores a data value of ABC (712a) and thus fingerprint table 710a contains the corresponding fingerprint (i.e., Hash(ABC)). Similarly, storage device N (706b) stores a data value of DEF (712b) and thus fingerprint table 710b has the corresponding fingerprint of Hash (DEF) stored on it. (In order to maintain the readability of this figure, some elements of the fingerprint table are not shown, such as the physical address at which a corresponding piece of data is stored. Some more detailed examples of fingerprint tables are described in further detail below.)

Since storage device 1 (706a) has the fingerprint value of interest stored in fingerprint table 710a, a Yes response (704a) is sent to storage array controller 700 indicating that the answer to the query is Yes (i.e., the fingerprint value Hash(ABC) is stored in the sending storage device), identification of storage device 1 (706a) as the sender of the response, the value of the fingerprint for which the response is being sent (e.g., in case the storage array controller is juggling queries for multiple fingerprints simultaneously, this permits the responses to be matched up with the proper fingerprints), and a referenced logical address (RLA) with which the fingerprint (i.e., write data) is associated. For example, if the same write data was previously received in a write instruction from the host with a logical address of 111 (e.g., to be written to), then the RLA field in response 704a would be RLA: 111.

In contrast, storage device N (706b) does not have a fingerprint value of Hash(ABC) stored in fingerprint table 710b. As such, a No response (704b) is sent, indicating that the answer to the query is No, the sender of the response is storage device N (706b), and the fingerprint for which the response is being sent (e.g., as described above, for embodiments where multiple fingerprints are being queried simultaneous and the storage array controller needs to know which fingerprint the response is for). Since the fingerprint in question is not stored on the responding storage device, No response 704b does not include a referenced logical address (RLA).

Storage devices 706*a* and 706*b* use a variety of processes or calls to access and manage fingerprint tables 710*a*-710*b*. The lookup(<fingerprint>) process (e.g., performed by table lookup 714*a* and 714*b*) searches the fingerprint table to find an entry (if any) with the same fingerprint value as the specified fingerprint value. The lookup process is invoked, for example, when a storage device receives a query from the storage array controller. The lookup process (if successful) returns a logical address associated with the fingerprint or hash which is then sent to the storage array controller by the storage device. For reasons that will be described in further detail below, returning a logical address is attractive because it enables a duplicate list to be built that exists entirely in a logical dimension (e.g., as opposed to a physical dimension).

The insert(<fingerprint>, <logical address>) process (e.g., performed by table insert 716*a* and 716*b*) is used by the storage device when it needs to add an entry to the fingerprint table where the inputs to the insert process are the fingerprints received from the storage array controller and the logical address associated with that data.

Figure 8:
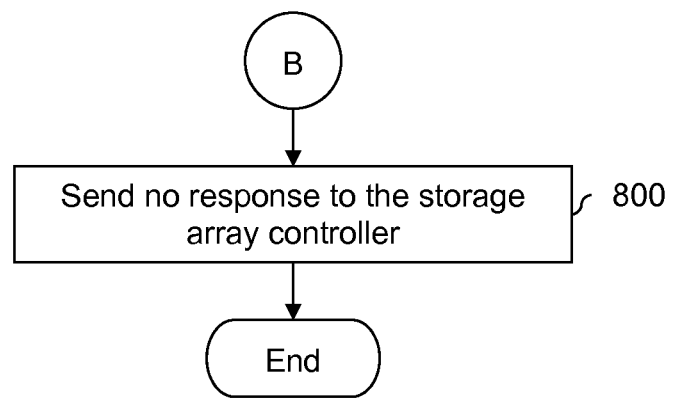
FIG. 8 is a flowchart illustrating an embodiment of a passive response process performed by a storage device in the event a fingerprint is not stored by that storage device.

FIG. 8 is a flowchart illustrating an embodiment of a passive response process performed by a storage device in the event a fingerprint is not stored by that storage device. FIG. 8 shows one example of how FIG. 5 may be continued if the decision at step 502 in FIG. 5 is No. At 800, no response is sent. To put it another way, a storage device stays silent if the fingerprint contained in the query is not stored on that storage device. The following figure shows an example of this.

Figure 9:
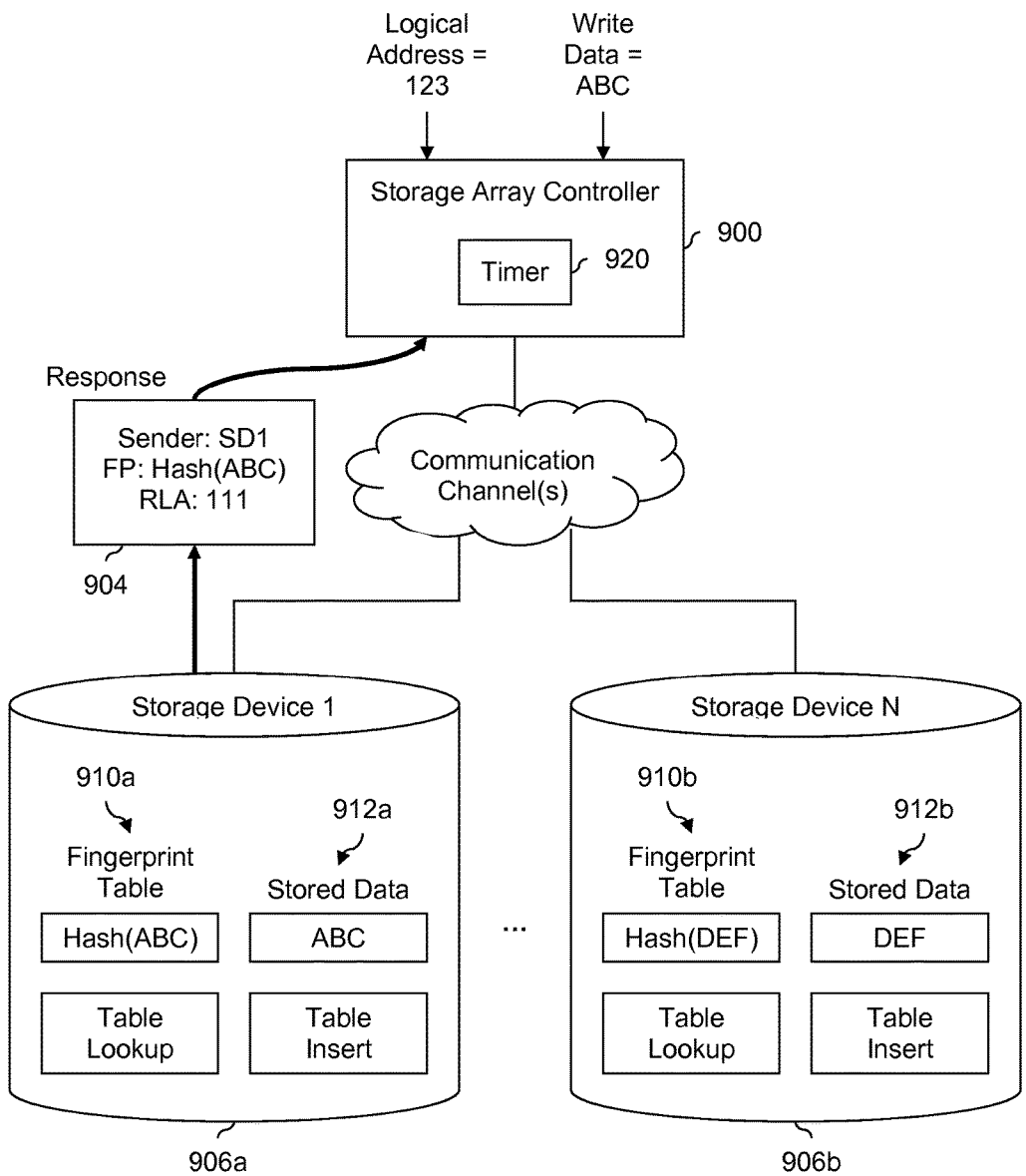
FIG. 9 is a diagram illustrating an embodiment of a deduplication storage system which uses passive responses in the event a fingerprint is not stored by a storage device.

FIG. 9 is a diagram illustrating an embodiment of a deduplication storage system which uses passive responses in the event a fingerprint is not stored by a storage device. As before, a query about fingerprint Hash(ABC) has been sent to storage devices 906*a*-906*b*, and as before, storage device 1 (906*a*) has the fingerprint stored, but storage device N (906*b*) does not.

In this example, storage device 1 (906*a*) sends a response (904) to storage array controller 900. Since in this embodiment a storage device stays silent if a fingerprint is not stored by that storage device, the act of responding in and of itself is an indication that the sending device has a fingerprint stored. As such, response 904 does not include an Answer field (e.g., compared to responses 704*a* and 704*b*).

Since storage device N (906*b*) does not have the fingerprint Hash(ABC) stored, storage device N (906*b*) stays silent.

Storage array controller 900 has a timer (920) which is started when the query (not shown) is sent out. Once the timer expires, it is assumed or otherwise concluded that the storage devices which did not respond do not have the fingerprint for which a query was sent. Naturally, if a storage array controller is configured to juggle queries for multiple fingerprints simultaneously, then such a storage array controller will include multiple timers.

Even in the event response 904 arrives at storage array controller 900 after timer 920 has expired and storage array controller 900 sends the write data to storage device N (906*b*) on which the data is not already stored, the operation of the system is still correct. That is, the system has stored the write data and will be able to retrieve it later, which is the most important service guarantee.

Returning to FIG. 1, in various embodiments (e.g., depending upon if the storage devices in the system are configured to use passive responses or active responses when a particular fingerprint is not stored thereon), a storage controller may continue the process of FIG. 1 in a variety of ways. The following figures describe some embodiments.

Figure 10:
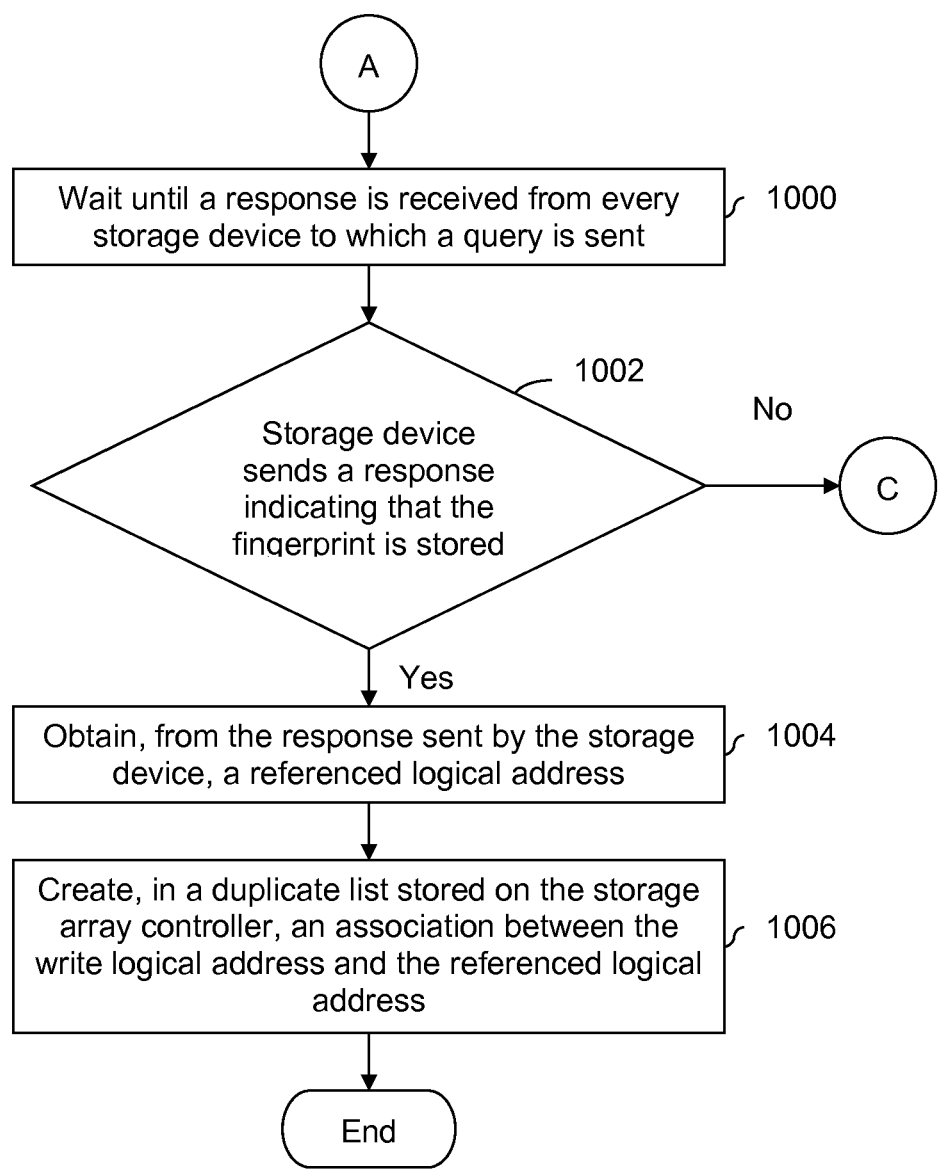
FIG. 10 is a flowchart illustrating an embodiment of duplication handling performed by a storage array controller after one or more queries are sent to the storage devices that are configured to actively respond to queries if the fingerprint is not stored.

FIG. 10 is a flowchart illustrating an embodiment of duplication handling performed by a storage array controller after one or more queries are sent to the storage devices that are configured to actively respond to queries if the fingerprint is not stored. FIG. 10 corresponds to the embodiment described in FIGS. 6 and 7.

At 1000, the storage array controller waits until a response is received from every storage device to which a query is sent. In this configuration, each storage device sends a response, even if the fingerprint in question is not stored by that storage device.

At 1002, it is determined if a storage device sends a response indicating that the fingerprint is stored thereon. Since the storage array controller waits for all storage devices to respond at 1000, the storage array controller will not inadvertently store a given piece of write data on one storage device when that piece of write data is already stored on another storage device. Put another way, if there are duplicates in the system, this configuration will detect it. As such, at most one storage device will respond at step 1002 that they have the fingerprint in question stored thereon.

If the check at step 1002 yields a Yes, then at 1004 a referenced logical address is obtained from the response sent by the storage device. As described above, at most one storage device will respond, so it is not necessary to narrow the field of responding storage devices down to one (e.g., by selection). In the example of FIG. 7, the referenced logical address consisting of 111 would be obtained from response 704*a*.

At 1006, an association between the write logical address and the referenced logical address is created in a duplicate list stored on the storage array controller. For example, storage array controller 700 in FIG. 7 would create an association between the write logical address of 123 (included in the write instruction from the host) and the referenced logical address of 111 (included in response 704*a*). Such an association or record would be stored in a duplicate table (not shown in FIG. 7) on storage array controller 700.

It is noted that in this example, the storage array controller (e.g., storage array controller 700 in FIG. 7) does not indicate to the storage device on which the write data and corresponding fingerprint are already stored (e.g., storage device 706*a* in FIG. 7) that an association or link should be created between the logical address in the write instruction and the referenced logical address. That is, the storage array controller tracks which logical addresses are duplicates of each other. In contrast, the storage devices are not aware of which logical addresses are duplicates of each other.

In some embodiments, storage devices in a deduplication storage system are configured to respond passively when a particular fingerprint is not stored. The following figure shows one embodiment of duplicate handling performed by a storage array controller in such a configuration.

Figure 11:
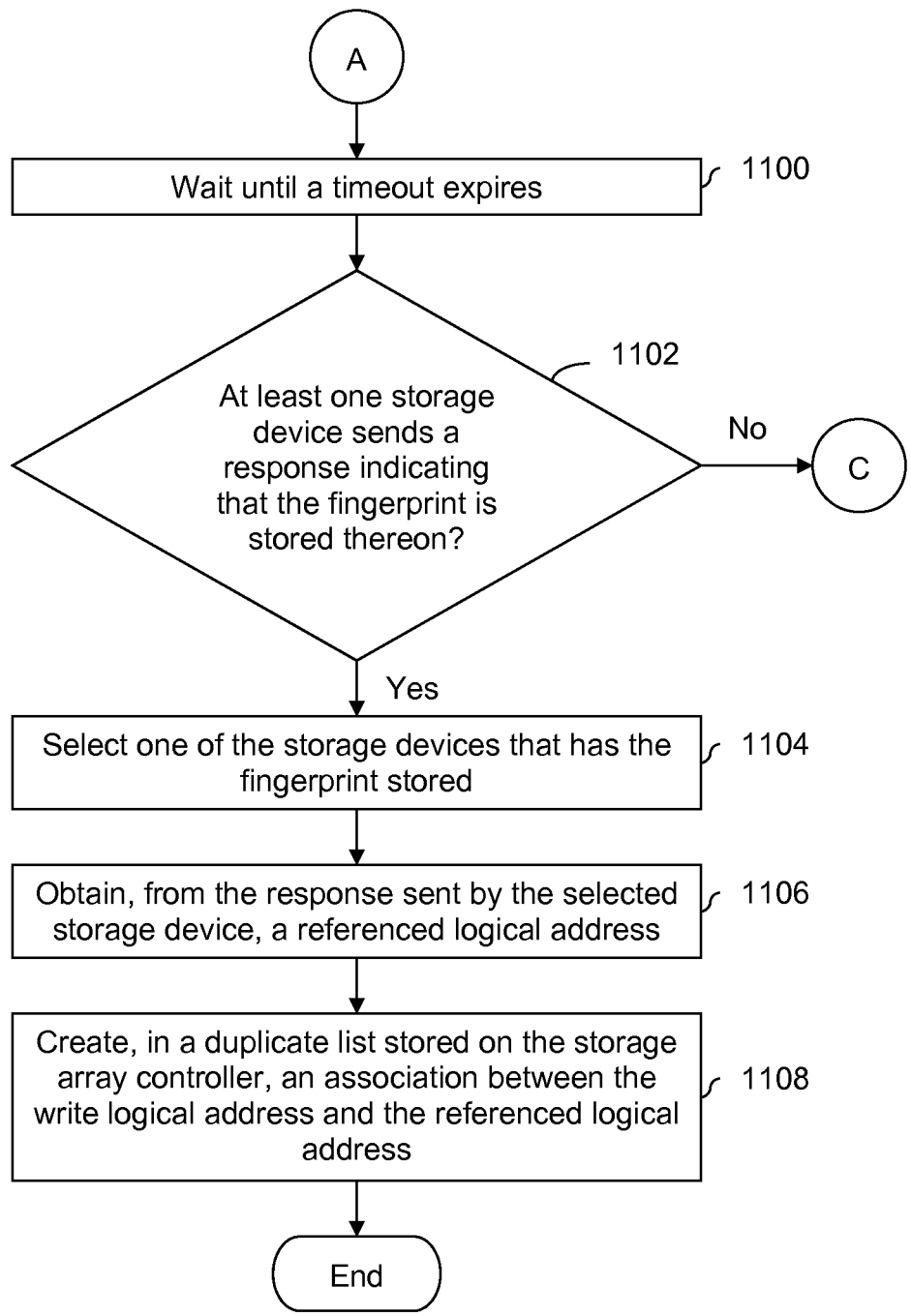
FIG. 11 is a flowchart illustrating an embodiment of duplication handling performed by a storage array controller after one or more queries are sent to the storage devices that are configured to passively respond to queries if the fingerprint is not stored.

FIG. 11 is a flowchart illustrating an embodiment of duplication handling performed by a storage array controller after one or more queries are sent to the storage devices that are configured to passively respond to queries if the fingerprint is not stored. FIG. 11 corresponds to the embodiment described in FIGS. 8 and 9.

At 1100, the storage array controller waits until a timeout expires. For example, the timeout may be set to a value that is sufficiently large enough for the storage devices to respond. For example, the timeout may be based on a worst case time to search the entire fingerprint table, some additional margin, etc.

At 1102, it is determined if there is at least one storage device that sends a response indicating that the fingerprint is stored thereon. If so, one of the storage devices that has the fingerprint stored is selected. In this configuration, there exists the possibility that a storage device (which has a piece of write data and corresponding fingerprint stored on it) responds after the timeout has expired. If so, the storage array controller may send the write data to another storage device, such that the write data is stored on two (or more) storage devices. For example, if storage device 906a in FIG. 9 does not respond before timer 920 expires, there exists the possibility that the write data is sent to storage device 906b. As such, the storage array controller selects one of the storage devices that has the fingerprint stored at step 1104.

At 1106, a referenced logical address is obtained from the response sent by the selected storage device. For example, the referenced logical address of 111 is obtained from response 904 in FIG. 9. At 1108, an association between the write logical address and the referenced logical address is created in a duplicate list stored on the storage array controller. Storage array controller 900 in FIG. 9 would, for example, create an association between the write logical address of 123 and the referenced logical address of 111.

In some embodiments, the first storage device that responds (i.e., that the fingerprint is stored thereon) is selected at step 1104. In some embodiments, the first storage device that responds (i.e., that the fingerprint is stored thereon) is selected without waiting for the timeout to expire at 1100. Such embodiments may be desirable in applications where shortening the latency or response time is desirable.

In some embodiments, the selection at step 1104 is based on wear-leveling considerations. When the deduplication storage system is a solid state (e.g., Flash) deduplication storage system, wear-leveling is an important consideration since programming and erasing are very stressful on the electrical insulation, making the solid state storage "leaky" as the program and erase (P/E) cycle count reaches a high count. Wear-leveling (where the system attempts to keep the program and erase (P/E) cycle count relatively even or otherwise the same for all pages or blocks of the storage) is thus an important consideration in order to maximize the lifetime of the storage system (e.g., the lifetime is maximized when all pages or blocks wear out at the same time, which corresponds to keeping the P/E cycle count relatively even for all pages or blocks).

In one example where wear-leveling is taken into consideration at step 1104, the system attempts to maintain similar P/E cycle counts across all storage devices (e.g., because all of the storage devices are of the same age and/or came online at the same time). In such an embodiment, the responding storage device for which the referenced logical address has the highest P/E cycle count is selected as the one for which an association is created in the duplicate list at step 1108. This is because the system wants to free up the referenced logical address with the lowest P/E cycle count so that it can be programmed and erased, thus increasing that (low) P/E cycle count so that it is closer to other P/E cycle counts. Increasing the number of things referring to the referenced logical address (with the lowest P/E cycle count) would actually make it harder to free up that logical address, which is the opposite of what the system wants to do.

In some embodiments, the selection at step 1104 is based on load balancing considerations. For example, suppose a piece of write data is only seen twice: once for a first write instruction and again later for a second write instruction, but (for the reasons described above) the first occurrence of the write data is stored on a first storage device and the second occurrence is stored on a second storage device. The storage array controller (in this example at least) selects the storage device that is emptier from which to obtain the referenced logical address. That way, if the write data on the fuller storage device is deleted or overwritten by the host, it will not need to be kept around (e.g., because there is no association with the third occurrence of the write data), thus freeing up some space on the fuller storage device.

Returning to FIGS. 10 and 11, the following figures show one embodiment of how a storage array controller handles write data when no duplicate is found (e.g., when the check at step 1002 in FIG. 10 is No, and/or when the check at step 1102 in FIG. 11 is No). It is noted that this is merely one example and is not intended to be limiting.

Figure 12:
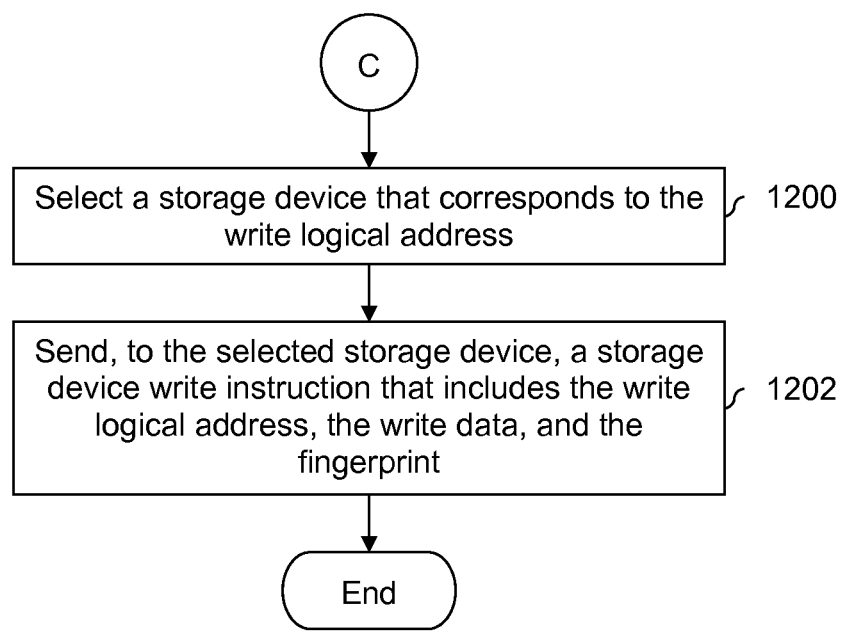
FIG. 12 is a flowchart illustrating an embodiment of write data handling when a fingerprint is not stored on the storage devices.

FIG. 12 is a flowchart illustrating an embodiment of write data handling when a fingerprint is not stored on the storage devices. In various embodiments, the process of FIG. 12 may be used together with FIG. 10 (e.g., after a No decision at step 1002) and/or FIG. 11 (e.g., after a No decision at step 1102). In the example shown, the process is performed by a storage array controller.

At 1200, a storage device that corresponds to the write logical address is selected. In this particular example, each logical address corresponds to a specific storage device. For example, a first range of logical addresses corresponds to a first storage device, a second range of logical addresses corresponds to a second logical address, and so on.

At 1202, a storage device write instruction that includes the write logical address, the write data, and the fingerprint is sent to the selected storage device. For example, the write data may be stored at some physical address on the selected storage device. The fingerprint and the physical address are stored in a fingerprint table, and the logical address and the physical address are stored in a mapping table.

Figure 13:
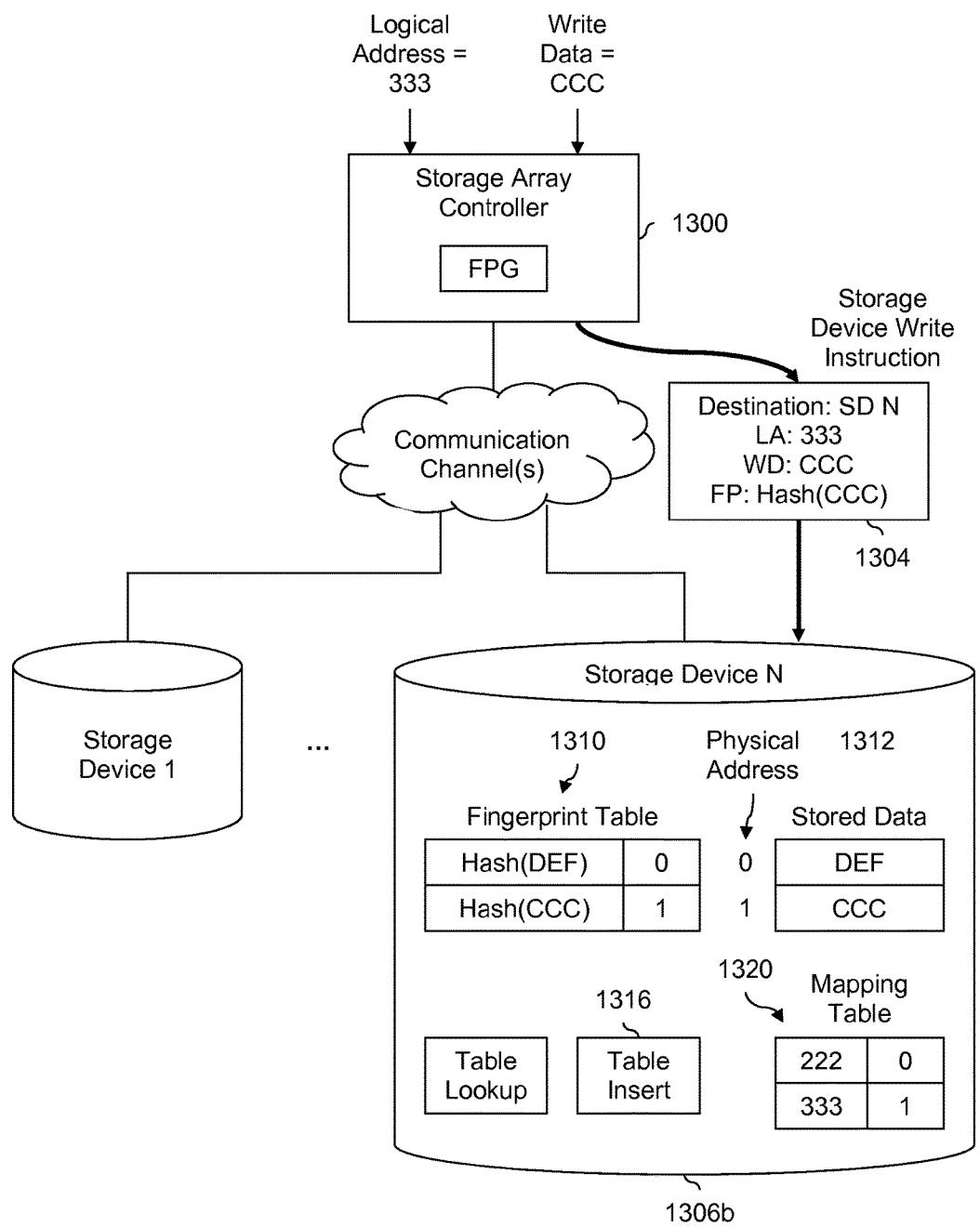
FIG. 13 is a diagram illustrating an embodiment of write data handling when a fingerprint and corresponding write data are not already stored on storage devices.

FIG. 13 is a diagram illustrating an embodiment of write data handling when a fingerprint and corresponding write data are not already stored on storage devices. In the example shown, storage device 1306b is selected by storage array controller 1300 on which to store the write data and fingerprint, for example because the logical address in the write instruction from the host (i.e., 333) corresponds to storage device 1306b.

Communication 1304 is one example of a storage device write instruction. In order to differentiate such a write instruction from a write instruction that is received by storage array controller 1300 (e.g., from a host), write instruction 1304 is referred to herein as a storage device write instruction. In the example shown, storage device write instruction 1304 includes the destination storage device (e.g., for those embodiments where a shared communication channel is used), the logical address (in this example, 333), the write data (in this example, CCC), and the fingerprint (in this example, Hash(CCC)).

The state of storage device 1306b shown shows the changes made in response to storage device write instruction 1304. As is shown, the write data (i.e., CCC) is added to stored data 1312 at physical address 1. In fingerprint table 1310, a new association or link is made between the fingerprint in storage device write instruction 1304 (i.e., Hash (CCC)) and the physical address at which the write data is stored (i.e., 1). Table insert 1316 may be used to perform the insertion into fingerprint table 1310. In mapping table 1320, a new association or link is created between the logical address included in storage device write instruction 1304 (i.e., 333) and the physical address at which the write data is stored (i.e., 1).

Naturally, the information that is stored in a storage system will at some point be read back. The following flowchart illustrates an embodiment of a read process. In some embodiments, some other read process is used.

Figure 14:
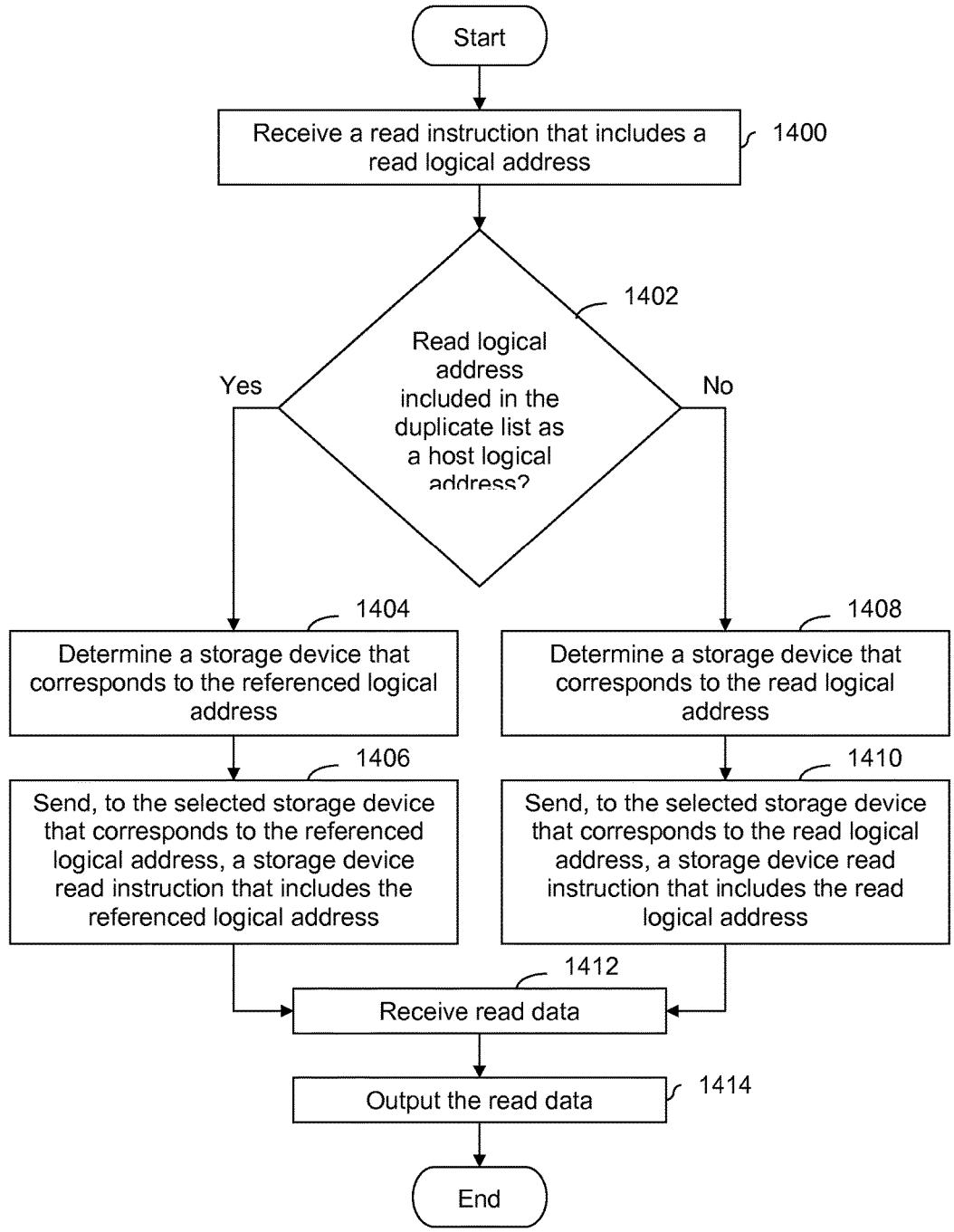
FIG. 14 is a flowchart illustrating an embodiment of a read process.

FIG. 14 is a flowchart illustrating an embodiment of a read process. In the example shown, the process is performed by a storage array controller. At 1400, a read instruction that includes a read logical address is received. For example, the read instruction may be from a host and such a read instruction may also be a host logical address (i.e., a logical address used by a host). In some embodiments, the read instruction includes a read buffer where the read-back data is to be deposited or returned.

At 1402, it is determined if the read logical address is included in the duplicate list as a host logical address. The following figure shows an example of this.

Figure 15:
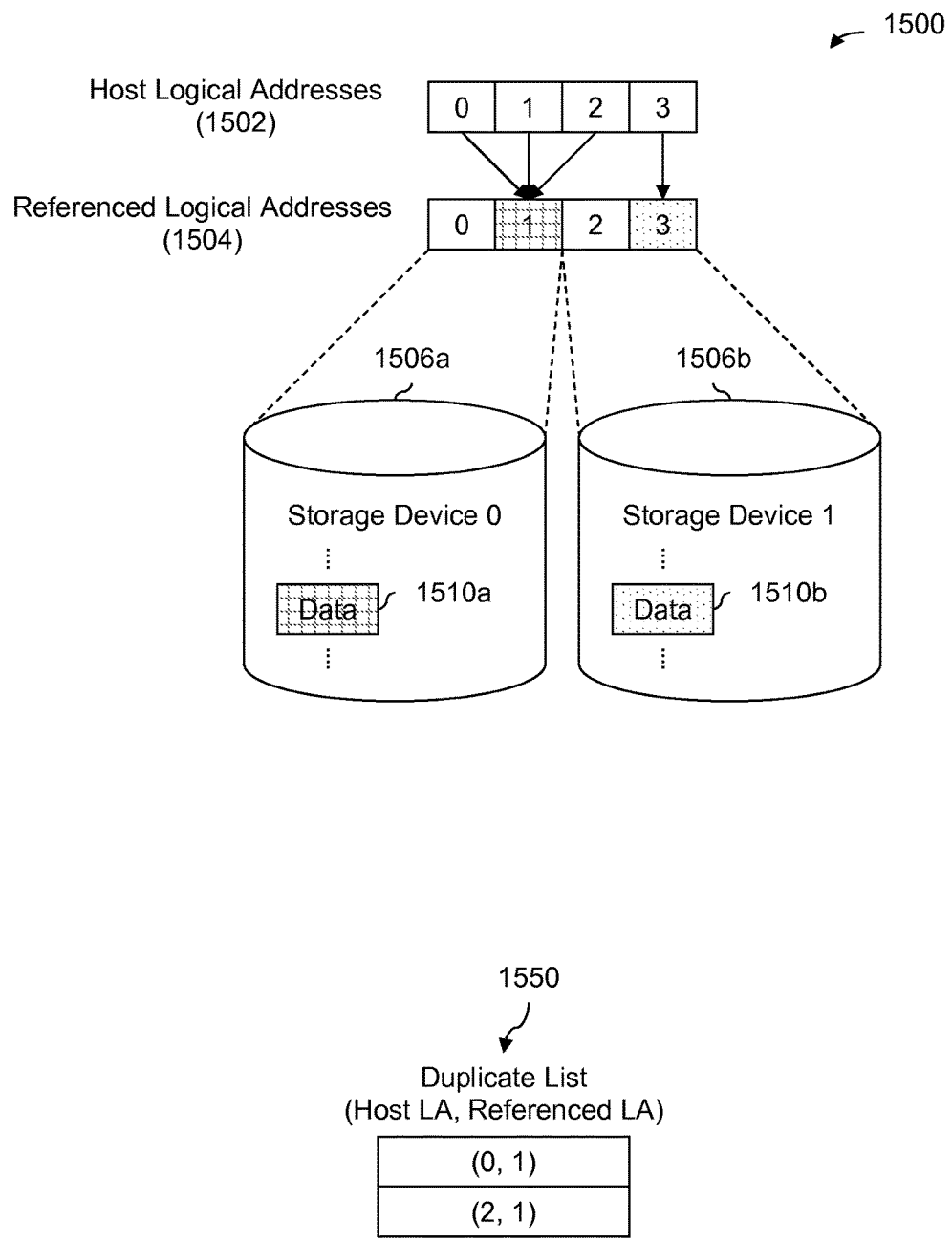
FIG. 15 is a diagram illustrating an embodiment of host logical addresses, related referenced logical addresses, and a corresponding duplicate list.

FIG. 15 is a diagram illustrating an embodiment of host logical addresses, related referenced logical addresses, and a corresponding duplicate list. In order to clearly describe the technique, this example shows a relatively small range of addresses and a relatively small duplicate list. Naturally, the techniques described herein are applicable to an address range of any size and/or a duplicate list of any size.

In diagram 1500, the host logical addresses (1502) are the (logical) addresses used by a host. A write instruction from a host will (for example) include a host logical address and a read instruction from a host will (for example) include a host logical address.

Each host logical address in group 1502 points to one of the referenced logical addresses in group 1504. The referenced logical address pointed to by a given host logical address is the logical address which will be used to retrieve the data for that host logical address. For example, host logical address 0 points to referenced logical address 1. As such, if a read instruction includes a read logical address of 0, then a referenced logical address of 1 is used (e.g., by sending to the appropriate storage device, a host device read instruction that includes an address of 1 (i.e., the referenced logical address)). Similarly, host logical addresses 1 and 2 point to referenced logical address 1. As such, if a read instruction is received from a host with a read logical address of 1 or 2, a referenced logical address of 1 would also be used.

These links or associations between host logical addresses 1502 and referenced logical addresses 1504 are captured by and/or reflected in duplicate list 1550. Duplicate list 1550 is stored and managed by a storage array controller (not shown). For example, duplicate list 1550 is consulted by a storage array controller when a read instruction is received from a host. Or, duplicate list 1550 is updated (when appropriate) by a storage array controller when a write instruction is received from a host. In diagram 1500, read logical address 0, 1, and 2 all point to a referenced logical address of 1. In duplicate list 1550, this is recorded as duplicates (0, 1) and (2, 1), where the host logical address is the first element in the pair and the referenced logical address is the second element in the pair.

Only duplicates or (as will be described later) links or associations where the host logical address and corresponding referenced logical address are not the same number are recorded in the duplicate list. As such, there is no (1, 1) entry in duplicate list 1550. Similarly, there is no (3, 3) entry in duplicate list 1550.

Returning to FIG. 14, step 1402 determines if the read logical address is included in the duplicate list as a host logical address. In one example of this, in FIG. 15, a storage array controller (not shown) accesses duplicate list 1550. The storage array controller looks for an entry in duplicate list 1550 where the first element in the pair is the read logical address. For example, if the read logical address is 2, then the second entry (i.e., (2, 1)) in duplicate list 1550 in FIG. 15 would cause the check at step 1402 to be satisfied.

If the decision at step 1402 is Yes, then at 1404, a storage device that corresponds to the referenced logical address is determined. The referenced logical address is the one that is referred to by the read logical address in the duplicate list. Consider the example described above. The referenced logical address that corresponds to a read logical address of 2 is 1 (see, e.g., the second entry (i.e., (2, 1)) in duplicate list 1550 in FIG. 15). Diagram 1500 shows one example of how the referenced logical addresses (1504) correspond or otherwise map to the two exemplary storage devices (as described above, the quantities and/or sizes shown are merely exemplary and are not intended to be limiting). Specifically, the (referenced) logical addresses of 0 and 1 correspond to storage device 1506a and the (referenced) logical addresses of 2 and 3 correspond to storage device 1506b. Note, for example, data 1510a is shown with a grid pattern on storage device 1506a; the referenced logical address of 1 is also shown with a grid pattern. Similarly, data 1510b on storage device 1506b is shown with a dotted pattern, as is the referenced logical address of 3. In this example, for a read logical address of 2, the corresponding storage device is storage device 1506a.

Returning to FIG. 14, at 1406, a storage device read instruction that includes the referenced logical address is sent to the selected storage device that corresponds to the referenced logical address. To continue the example from above, in FIG. 15, a storage device read instruction would be sent to storage device 1506a, where the instruction includes a (referenced) logical address of 1.

If the check at step 1402 is No, then a storage device that corresponds to the read logical address is determined at 1408. In FIG. 15, for example, the check at step 1402 would be No for a read logical address of 3. Note, for example, that duplicate list 1550 does not include an entry with a first element of 3. As is shown in diagram 1500, a logical address of 3 corresponds to storage device 1506b; this would be the storage device selected or otherwise determined at step 1408 for this particular example.

At 1410, a storage device read instruction that includes the read logical address is sent to the selected storage device that corresponds to the read logical address. In FIG. 15, for example, a storage device read instruction would be sent to storage device 1506b with a (read) logical address of 3. It is noted that the instructions generated at 1406 and 1410 are indistinguishable to a receiving storage device.

After sending the storage device read instruction at step 1406 or step 1410, read data is received at 1412. If the read path goes through steps 1404 and 1406, then the read data is received from the selected storage device that corresponds to the referenced logical address. If the read path goes through steps 1408 and 1410, then the read data is received from the selected storage device that corresponds to the read logical address.

At 1414, the read data is output. For example, the storage array controller returns the read data to a host. In some embodiments where a read instruction (e.g., from a host) includes a buffer in which to deposit the read data, the read data is output into the buffer.

It is noted that all of the addresses in duplicate list 1550 are logical addresses. That is, the read logical addresses and referenced logical addresses in duplicate list 1550 do not describe the actual physical locations at which the corresponding data is stored on storage devices 1506a or 1506b. As such, duplicate list 1550 is not an address map. An address map tracks links or associations between physical addresses and logical addresses; in some embodiments, storage devices 1506a and 1506b each manage their own mapping table.

Such duplicate lists that are strictly logical (i.e., they do not contain physical addresses) are particularly useful in certain systems, such as solid state storage systems. In solid state storage systems, data often needs to be moved from one physical location to another (e.g., without changing the logical address) because of garbage collection or other processes that are specific to solid state storage. Since the duplicate list is not tied to the (actual) physical locations, a storage array controller which reads from and writes to the duplicate list does not need to be paused or otherwise halted when garbage collection or other processes which move data from one physical location to another are running. In contrast, if a storage array controller used an address map (which does include physical addresses) during deduplication, such a storage array controller would need to be halted during garbage collection or at other times when the data is being moved from one physical address to another.

In some embodiments, a storage device write instruction (see, e.g., storage device write instruction 1304 in FIG. 13) has a variety of optional flags (e.g., where there is no value or other input which needs to be specified) and/or inputs (e.g., where something does need to be specified if that optional feature or service is invoked) which provide extended and optional write semantics. Such optional flags and/or inputs may be used to instruct the storage device to perform a write in a specific manner which (ideally) optimizes some performance parameter and/or system management consideration. First, an example is described that does not use such an exemplary flag. Then, an example is described that does use such an exemplary flag and/or input. This will clearly illustrate at least one case where the use of such an optional flag and/or input improves performance.

Figure 16:
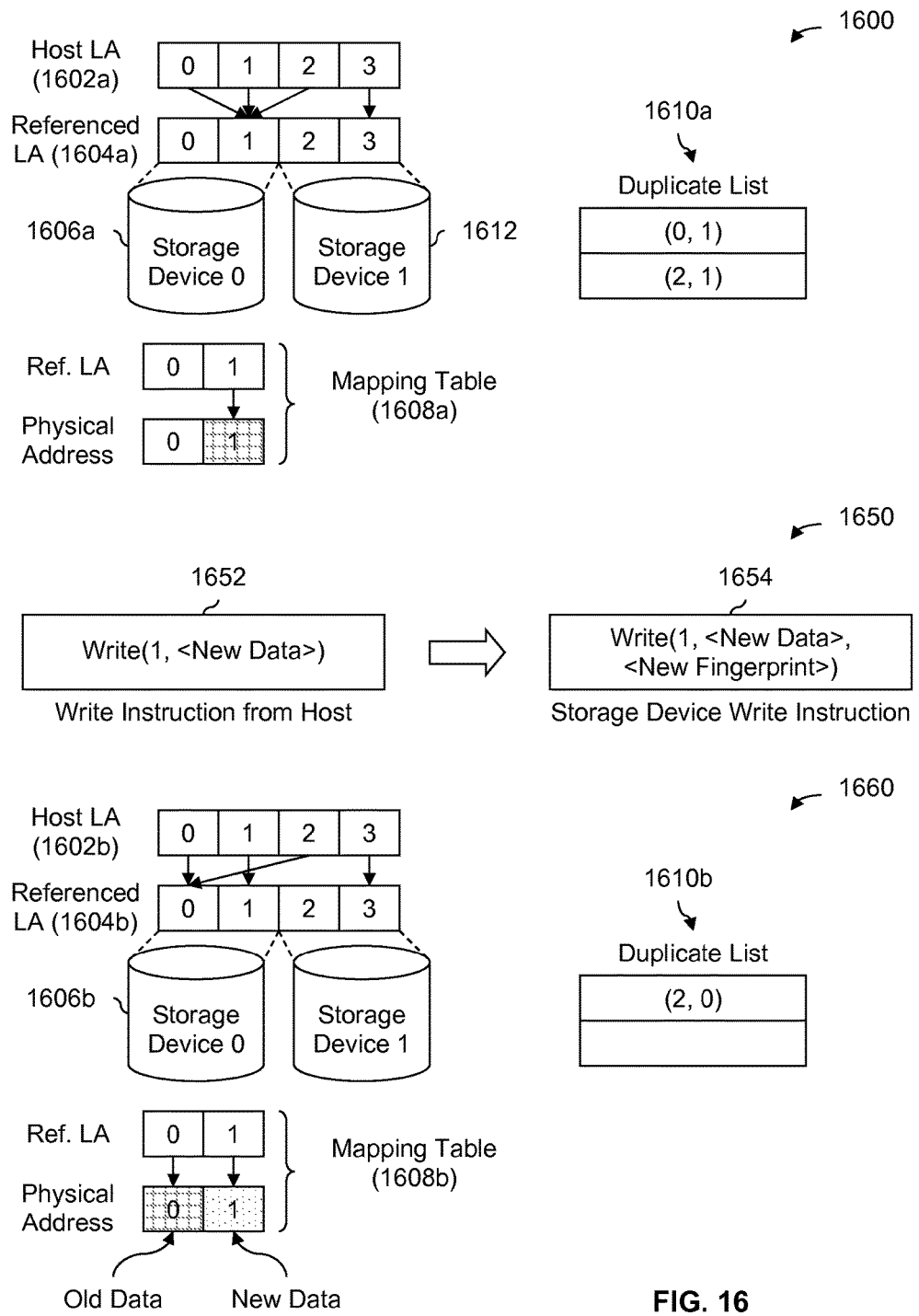
FIG. 16 is a diagram illustrating an embodiment of a storage device write instruction without an optional remap input.

FIG. 16 is a diagram illustrating an embodiment of a storage device write instruction without an optional remap input. In the example shown, diagram 1600 shows the state of the system before a write instruction is received from a host. At the point in time shown, host logical addresses 0, 1, and 2 (in group 1602a) point to referenced logical address 1 (in group 1604a) and host logical address 3 (in group 1602a) points to referenced logical address 3 (in group 1604a). This corresponds to duplicate list 1610a which includes (0, 1) and (2, 1). Mapping table 1608a is stored by and managed by storage device 1606a. A mapping table shows the referenced logical addresses (e.g., passed to storage device 1606a in a host device read instruction from a storage array controller) and corresponding physical address (if any). In some embodiments, a mapping table includes logical block addresses and physical block addresses. Due to space constraints and because it is not relevant for this demonstration, a mapping table for storage device 1612 is not shown.

In diagram 1650, write instruction 1652 is received from a host. The write instruction includes a write (host) logical address of 1 and some new data to be written to that write (host) logical address. The storage array controller uses one or more queries (as described above) to determine that the data contained in write instruction 1652 is not stored by storage device 1606a or 1612. In response, a storage array controller (not shown) generates storage device write instruction 1654 to be sent to storage device 1606a (e.g., since that storage device corresponds to the write (host) logical address received). In this example, storage device write instruction 1654 includes the write (host) logical address, the new data, and the corresponding new fingerprint.

Diagram 1660 shows the state of the system after storage device write instruction 1654 has been processed. Before the new data can be written to the storage device, the old data at physical address 1 needs to be preserved since host logical addresses 0 and 2 still reference or otherwise link to that old data. In this example, the old data is written to physical address 0. A link in mapping table 1608b is created between reference logical address 0 and physical address 0. Host logical addresses 0 and 2 in group 1602b now point to referenced logical address 0 in group 1604b.

Once the old data has been moved or otherwise copied to physical address 0 in storage device 1606b, the new data can be written to the physical address 1. Host logical address 1 in group 1602b points to referenced logical address 1 in group 1604b and has not changed between diagram 1600 and diagram 1660.

In response to the changes in links between host logical addresses 1602b and referenced logical addresses 1604b, duplicate list 1610b is updated so that the only entry is (2, 0).

In the state shown in diagram 1660 (i.e., the state of the links between host logical addresses 1602b and referenced logical addresses 1604b, as well as the state of the links in mapping table 1608b), host logical addresses 0 and 2 point to the old data (stored at physical address 0) and host logical address 1 points to the new data (stored at physical address 1).

The following figure shows how an optional remapping input improves performance.

Figure 17:
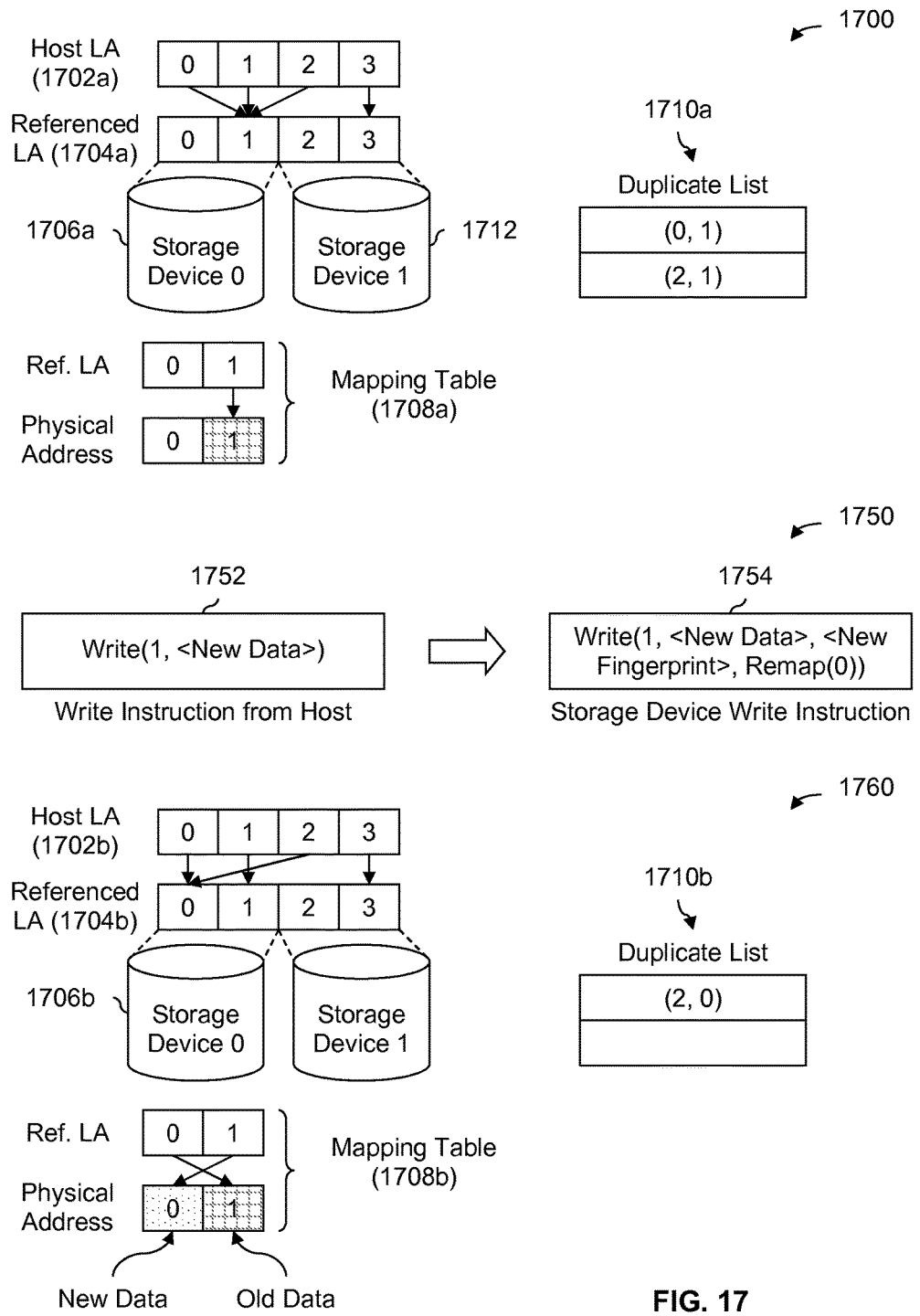
FIG. 17 is a diagram illustrating an embodiment of a storage device write instruction with an optional remap input.

FIG. 17 is a diagram illustrating an embodiment of a storage device write instruction with an optional remap input. In the example shown, the state of the system shown in diagram 1700 matches that shown in diagram 1600 in FIG. 16 and (as before) the storage array controller uses one or more queries to determine that the write data in write instruction 1752 is new. In diagram 1750, the same write instruction (1752) is received from the host as in FIG. 16. However, in this example, the storage array write controller (not shown) realizes that performing the write in the manner shown in FIG. 16 is not optimal. More specifically, writing the old data to a new location on storage device 1606a/1606b in FIG. 16 is very time consuming (e.g., because the old data is relatively long and/or the write speed supported by a storage device is relatively slow). It would be preferable if the new data were written in a manner that eliminated the need to move or otherwise copy the old data to another location on storage device 1606a/1606b in FIG. 16.

First, in order to detect this situation, the storage controller compares the host logical address received in write instruction 1652 with duplicate list 1610a. It looks for any referenced logical addresses (i.e., the second element) in any of the entries in duplicate list 1610a. In this example, both the (0, 1) entry and the (2, 1) entry in duplicate list 1610a have a referenced logical address of 1, so the storage array controller can predict that performing the write in this manner would not be desirable.

As such, the storage array controller assembles storage device write instruction 1754 which includes an optional remap input (in this example, "Remap(0)"). The address specified in the remap input is a referenced logical address that is not in use in the mapping table at the time the storage device write instruction is generated (note, for example, that referenced logical address 0 in group 1704a is not being pointed to by any of the host logical addresses 1702a). The storage array controller can thus include a referenced logical address of 0 in the remap input in storage device write instruction 1754.

In response to receiving storage device write instruction 1754, the receiving storage device (in this example, storage device 0) will write the new data to some unused physical address (in this example, physical address 0). The storage device will then change (i.e., remap) the mapping table so that the referenced logical address specified in the first field in storage device write instruction 1754 (i.e., referenced logical address 1) points to the physical address where the new data is stored (in this example, physical address 0). The referenced logical address specified in the remap input in the fourth field in storage device write instruction 1754 (in this example, referenced logical address 0) will be mapped to the physical address where the old data was stored and which referenced logical address 1 used to point to in mapping table 1708a (in this example, physical address 1).

Diagram 1760 shows the state of the system after storage device write instruction 1754 has been processed. Between host logical addresses 1702b and referenced logical addresses 1704b, addresses 0, 1, 2, and 3 point to addresses 0, 1, 0, and 3, respectively. Duplicate list 1710b reflects this and has a single entry of (2, 0). In mapping table 1708b, referenced logical address 0 points to physical address 1 and referenced logical address 1 points to physical address 0.

It is noted that the state of the system shown in diagram 1760 is proper (in the sense that host logical addresses 0 and 2 reference or otherwise point to the old data, and host logical address 1 references or otherwise points to the new data), but the write was performed in a manner that did not require writing the old data to a new location in storage device 1706a/1706b.

Figure 18:
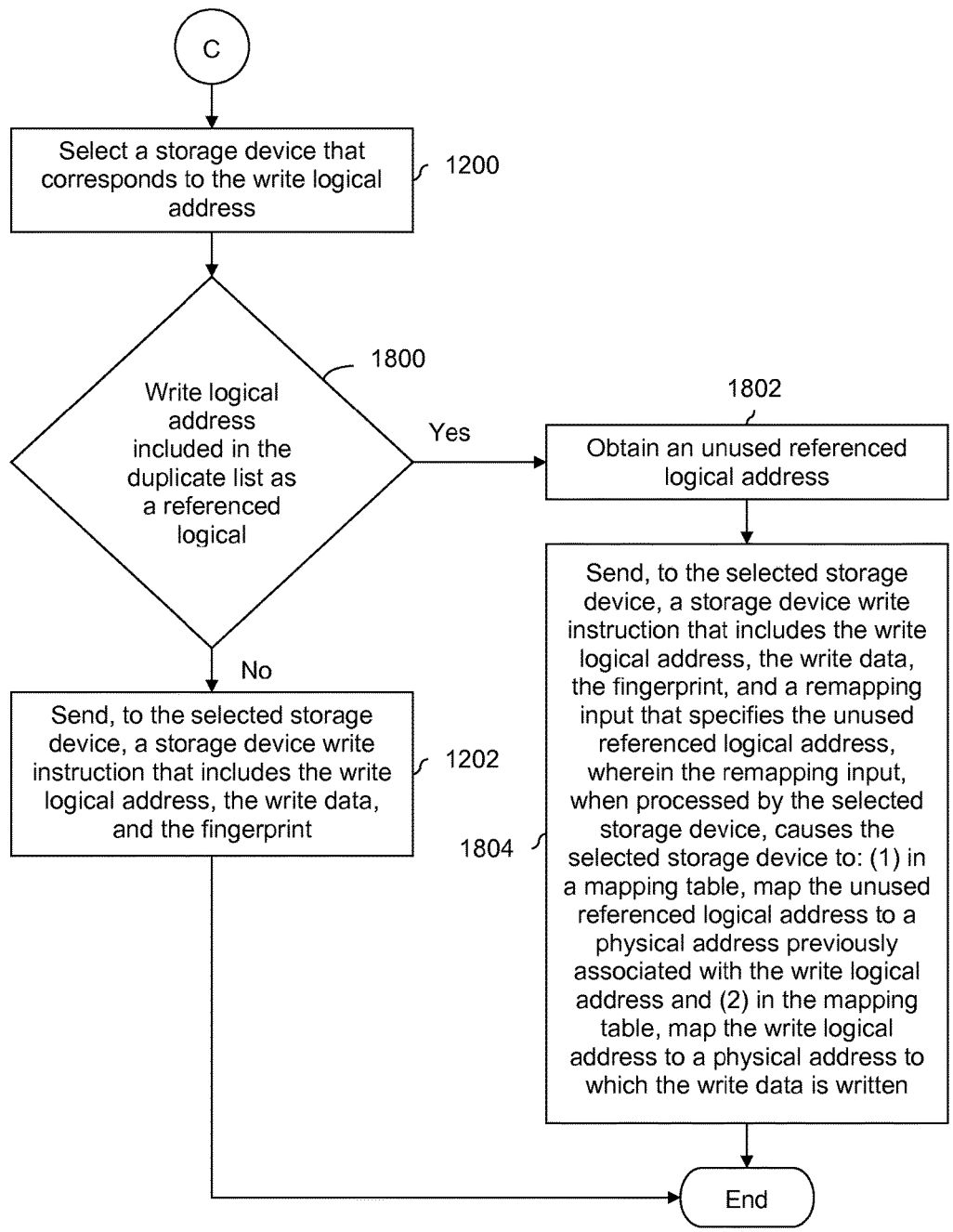
FIG. 18 is a flowchart illustrating an embodiment of a write data handling when a fingerprint is not stored on the storage devices and an address map remapping input is available.

FIG. 18 is a flowchart illustrating an embodiment of a write data handling when a fingerprint is not stored on the storage devices and an address map remapping input is available. In various embodiments, the process of FIG. 18 may be used together with FIG. 10 (e.g., after a No decision at step 1002) and/or FIG. 11 (e.g., after a No decision at step 1102). In order to demonstrate how this figure coexists with FIG. 12, steps which are included in FIG. 12 retain their numbering in this figure. In the example shown, the process is performed by a storage array controller.

At 1200, a storage device that corresponds to the write logical address is selected. At 1800, it is determined if the write logical address is included in the duplicate list as a referenced logical address. See, for example, FIG. 1750 where the write logical address of 1 in the write instruction from the host (1752) is referenced two times in duplicate list 1710a. The decision at step 1800 for this example would be Yes.

If the decision at step 1800 is Yes, then at 1802 an unused referenced logical address is obtained. For example, the storage array controller may maintain a list of logical addresses that are not referred to or in use, and a logical address may be selected from that list. In some embodiments, the unused referenced logical address that is selected is associated with the storage device selected at step 1200. In FIG. 17, for example, note that an unused referenced logical address associated with storage device 1706a, not storage device 1712, is selected.

At 1804, a storage device write instruction that includes the write logical address, the write data, the fingerprint, and a remapping input that specifies the unused referenced logical address is sent to the selected storage device, where the remapping input, when processed by the selected storage device, causes the selected storage device to: (1) in a mapping table, map the unused referenced logical address to a physical address previously associated with the write logical address and (2) in the mapping table, map the write logical address to a physical address to which the write data is written. Storage device write instruction 1754 in FIG. 17 shows one example of such a storage device write instruction. FIG. 17 also shows examples of the first resulting mapping and the second resulting mapping in the mapping table. The reference from referenced logical address 0 to physical address 1 in mapping table 1708b is an example of the first resulting change and the reference from referenced logical address 1 to physical address 0 in mapping table 1708b is an example of the second resulting change.

If the decision at step 1800 is No, a storage device write instruction is then sent to the selected storage device that includes the write logical address, the write data, and the fingerprint at 1202. See, for example, storage device write instruction 1654 in FIG. 16.

In addition to the optional remapping input for a storage device write instruction described above, there may be other optional inputs or flags. The following figures describe an optional keep flag for a storage device write instruction. First, a storage device write instruction without an optional keep flag is illustrated. Then, an embodiment of a storage device write instruction with an optional keep flag is described in order to illustrate improved performance.

Figure 19:
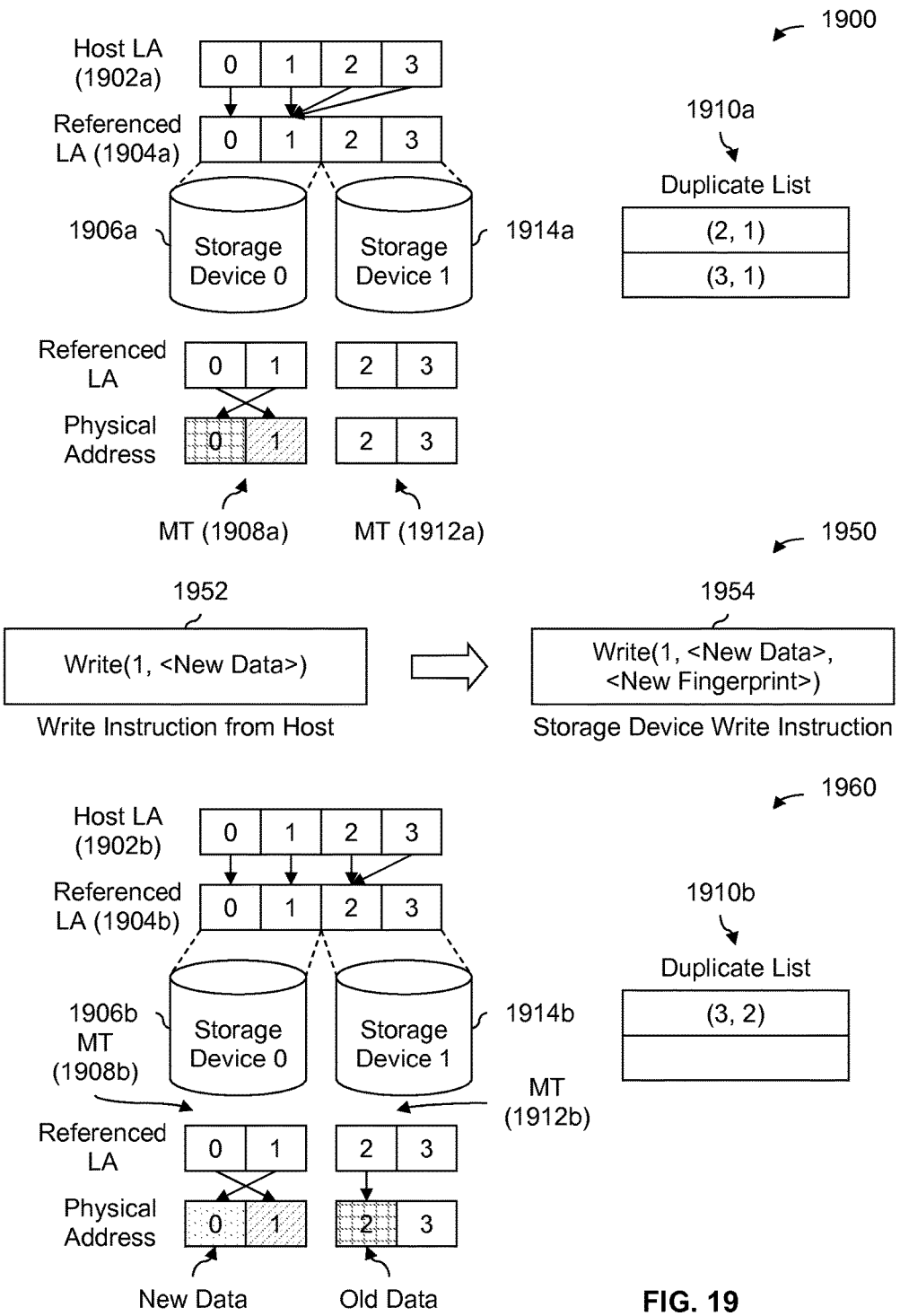
FIG. 19 is a diagram illustrating an embodiment of a storage device write instruction without an optional keep flag.

FIG. 19 is a diagram illustrating an embodiment of a storage device write instruction without an optional keep flag. In the example shown, diagram 1900 shows the state of a system before a write instruction is received. In the example shown, host logical addresses 0, 1, 2, and 3 in group 1902a point to referenced logical addresses 0, 1, 1, and 1 (respectively) in group 1904a. Accordingly, duplicate list 1910a has entries of (2, 1) and (3, 1). In storage device 1906a, mapping table 1908a has referenced logical address 0 pointing to physical address 1 and referenced logical address 1 pointing to physical address 0.

Diagram 1950 shows a write instruction received from a host (1952) and the corresponding storage device write instruction (1954) that is generated by a storage array controller (not shown) in response to receiving the write instruction from the host (1952). As described above, one or more queries are sent to the storage devices, enabling the storage array controller to determine that the data in the write instruction from the host (1952) is new. In this particular example, storage device write instruction 1954 includes the basic inputs: the write logical address (in this example, 1), the new data, and the new fingerprint that corresponds to the new data.

Diagram 1960 shows the state of the system after storage device write instruction (1954) is processed. As is seen in diagram 1900, storage device 1906a was already full before storage device write instruction (1954) was received. That is, there are no more physical addresses available in which to store the old data which still need to be associated with host logical addresses 2 and 3.

As such, the old data is copied (or, more generally, written) to physical address 2 in storage device 1914b and the new data is written to physical address 0 in storage device 1906b. In host logical addressees 1902b, the logical addresses 2 and 3 now point to referenced logical address 2 and in mapping table 1912b, referenced logical address 2 points to physical address 2. Duplicate list 1910*b* is also updated to have a single entry of (3, 2).

Performing a write in this manner is less than optimal because of the amount of time spent writing the old data to storage device 1914*a*/1914*b*. As described above, writing data to solid state storage takes a relatively long amount of time and it would be desirable if this step could be avoided. The following figure shows an example where the optional keep flag is used to keep data on a storage device, even if that storage device is full.

Figure 20:
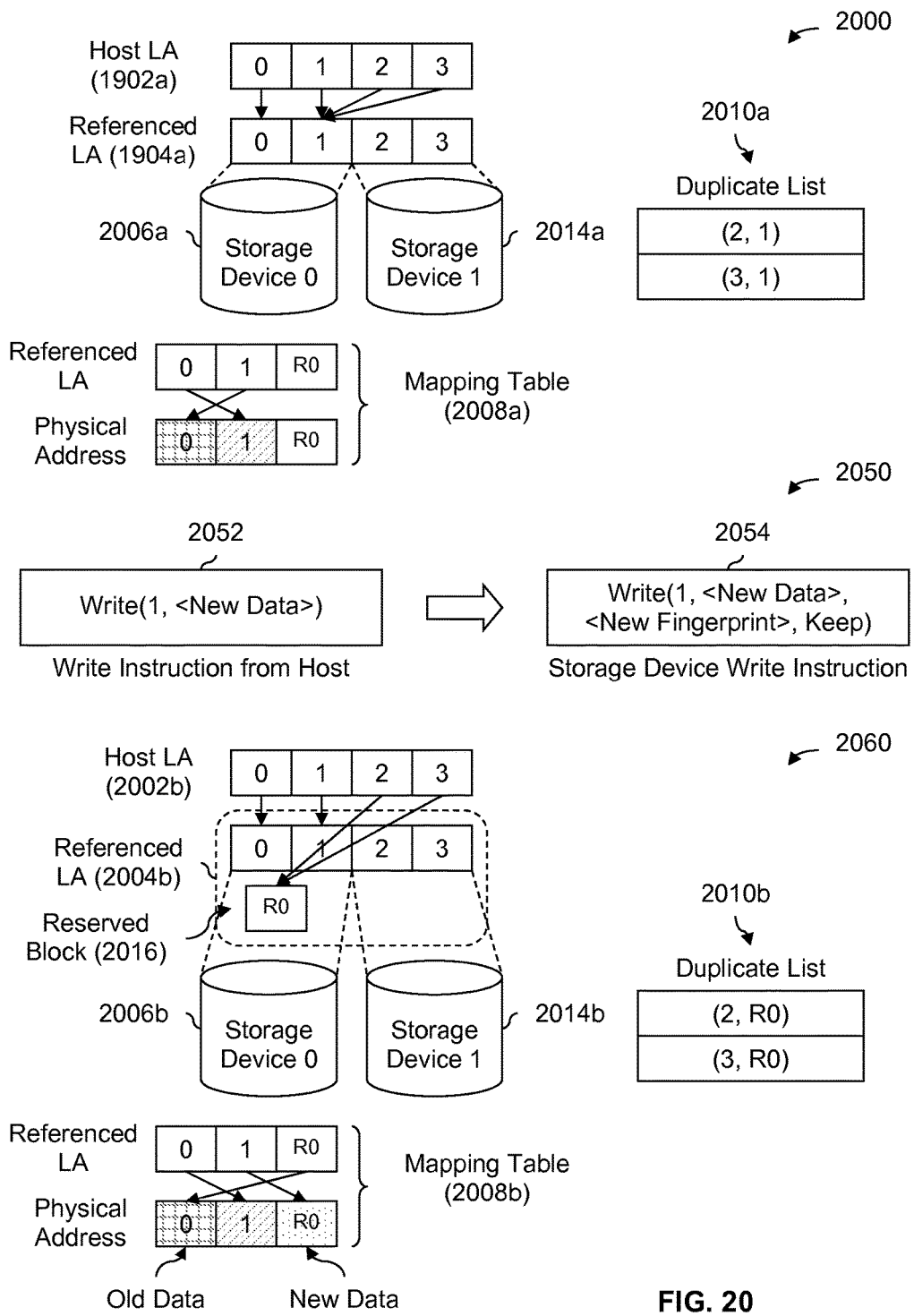
FIG. 20 is a diagram illustrating an embodiment of a storage device write instruction with an optional keep flag.

FIG. 20 is a diagram illustrating an embodiment of a storage device write instruction with an optional keep flag. In the example shown, the state of the system shown in diagram 2000 matches that shown in diagram 1900 in FIG. 19, and the write instruction received from the host (2052) matches the write instruction received from the host (1952) shown in FIG. 19. As before, queries are used to determine that the data in write instruction 2052 is not already stored by any of the storage devices.

In this example, however, the storage array controller generates storage device write instruction 2054 which includes the keep flag. The keep flag, when received by storage device 2006*a*/2006*b*, causes that storage device to keep all of the data (i.e., the old data, which must be retained, and the new data) on that storage device. More specifically, the storage device uses reserved blocks to keep all of the data on the storage device. In some other systems, the ability to instruct or otherwise force a storage device to make use of a reserved block is not exposed or otherwise made available to a storage array controller. That is, the decision about when it is appropriate to use a reserved block is left solely up to the storage device.

Diagram 2060 shows the state of the system after storage device write instruction 2054 has been executed by the system. As is shown, the new data is written to physical addresses R0 (associated with a reserved block) in storage device 2006*b*. In mapping table 2008*b*, referenced logical address 1 points to physical addresses R0 and in referenced logical addresses 2004*b*, referenced logical address 1 is pointed to by host logical address 1 in group 2002*b*. This causes the host logical address of 1 to be associated with the new data.

As for the old data, it remains associated with host logical addresses 2 and 3 via the following links or associations. Host logical addresses 2 and 3 in group 2002*b* point to reserved block 2016 (having a referenced logical address of R0) in referenced logical addresses 2004*b*. (It is noted that reserved block 2016 existed at the point in time shown in diagram 2000, but due to limited space it is not shown therein.) In mapping table 2008*b*, the referenced logical address R0 points to physical address 0 at which the old data is stored.

As shown, using the optional keep flag forces all of the data to remain on a given storage device. This prevents an unnecessary write to storage device 2014*a*/2014*b* from being performed. This is similar to the performance improvement shown in FIG. 17, except the write that was avoided was to the same storage device, whereas the write that was avoided here was to a different storage device.

It is noted the storage device 2006*a*/2006*b* must return the referenced logical block number (in this example, R0) to the storage array controller. The storage array controller will need to know this value so that when the host wants to read host logical address 2 or 3, the proper referenced logical address can be provided to storage device 2006*a*/2006*b*. See, for example, duplicate list 2010*b* which includes address R0 as a referenced logical address in the two entries. Some storage devices may need to be modified to return this information, since they may not be configured to expose reserved blocks.

Figure 21:
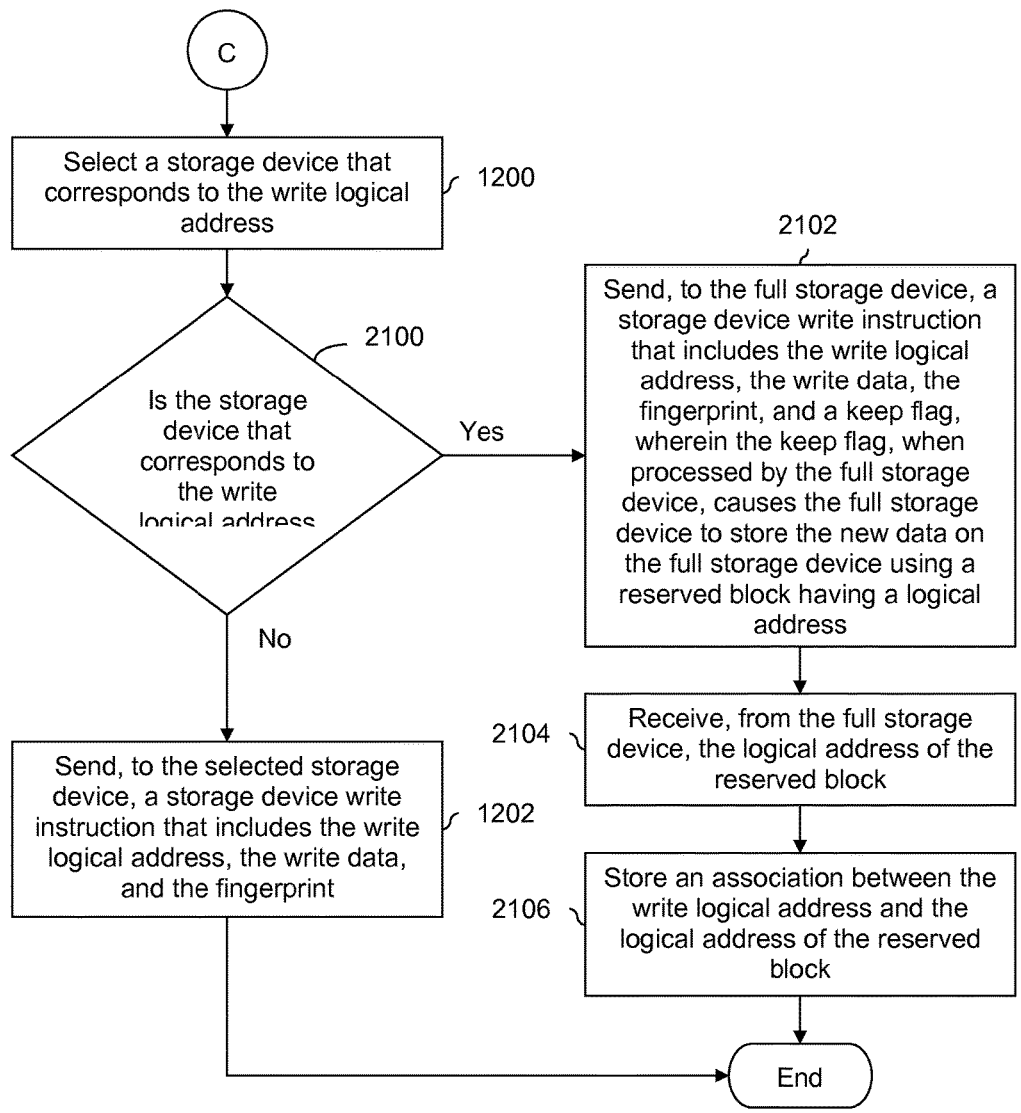
FIG. 21 is a flowchart illustrating an embodiment of a write data handling when a storage device is full and a keep flag is available.

FIG. 21 is a flowchart illustrating an embodiment of a write data handling when a storage device is full and a keep flag is available. In various embodiments, the process of FIG. 21 may be used together with FIG. 10 (e.g., after a No decision at step 1002) and/or FIG. 11 (e.g., after a No decision at step 1102). In order to demonstrate how this figure coexists with FIG. 12, steps which are included in FIG. 12 retain their numbering in this figure. In the example shown, the process is performed by a storage array controller.

At 1200, a storage device that corresponds to the write logical address is selected. In FIG. 20, for example, storage device 2006*a*/2006*b* corresponds to the write logical address of 1.

At 2100, it is determined if the storage device that corresponds to the write logical address is full. In FIG. 20, for example, storage device 2006*a*/2006*b* is full (e.g., at least with respect to blocks that are not reserved blocks). In some embodiments, a storage array controller queries a particular storage device to determine if that storage device is full. In some other embodiments, a storage array controller tracks the utilization percentages of each of the storage devices.

If the decision at step 2100 is Yes, then at 2102 a storage device write instruction that includes the write logical address, the write data, the fingerprint, and a keep flag is sent to the full storage device, where the keep flag, when processed by the full storage device, causes the full storage device to store the new data on the full storage device using a reserved block having a logical address. In FIG. 20, for example, the new data is stored in reserved block 2016 in diagram 2060.

At 2104, the logical address of the reserved block is received from the full storage device. For example, the storage array controller in FIG. 20 (not shown) would receive the logical address R0 from storage device 2006*b*.

At 2106, an association between the write logical address and the logical address of the reserved block is stored. As described above, the duplicate list may be used to store links or associations where the host logical address and corresponding referenced logical address are not the same number. This is an example of that, even if the reserved block is only referenced by a single host logical address. For example, even if the old data were only used by host logical address 2 (but not host logical address 3), an entry of (2, R0) would be stored in the duplicate list so that the proper referenced logical address can be determined and passed to the storage devices during a read of host logical address 2.

If the decision at 2100 is No, then a storage device write instruction that includes the write logical address, the write data, and the fingerprint is sent to the selected storage device at 1202.

A storage device typically does not have a lot of reserved blocks and using the keep flag may cause a storage device to eventually run out of available reserved blocks. The following figure shows an example of an optional shuffle instruction that is sent from a storage array controller to a storage device that has run out (or will soon run out) of reserved blocks. It may be desirable to have the storage array controller decide when to perform a shuffle (e.g., as opposed to the storage devices) because the storage array controller may have better insight as to when the system is quiet.

Figure 22:
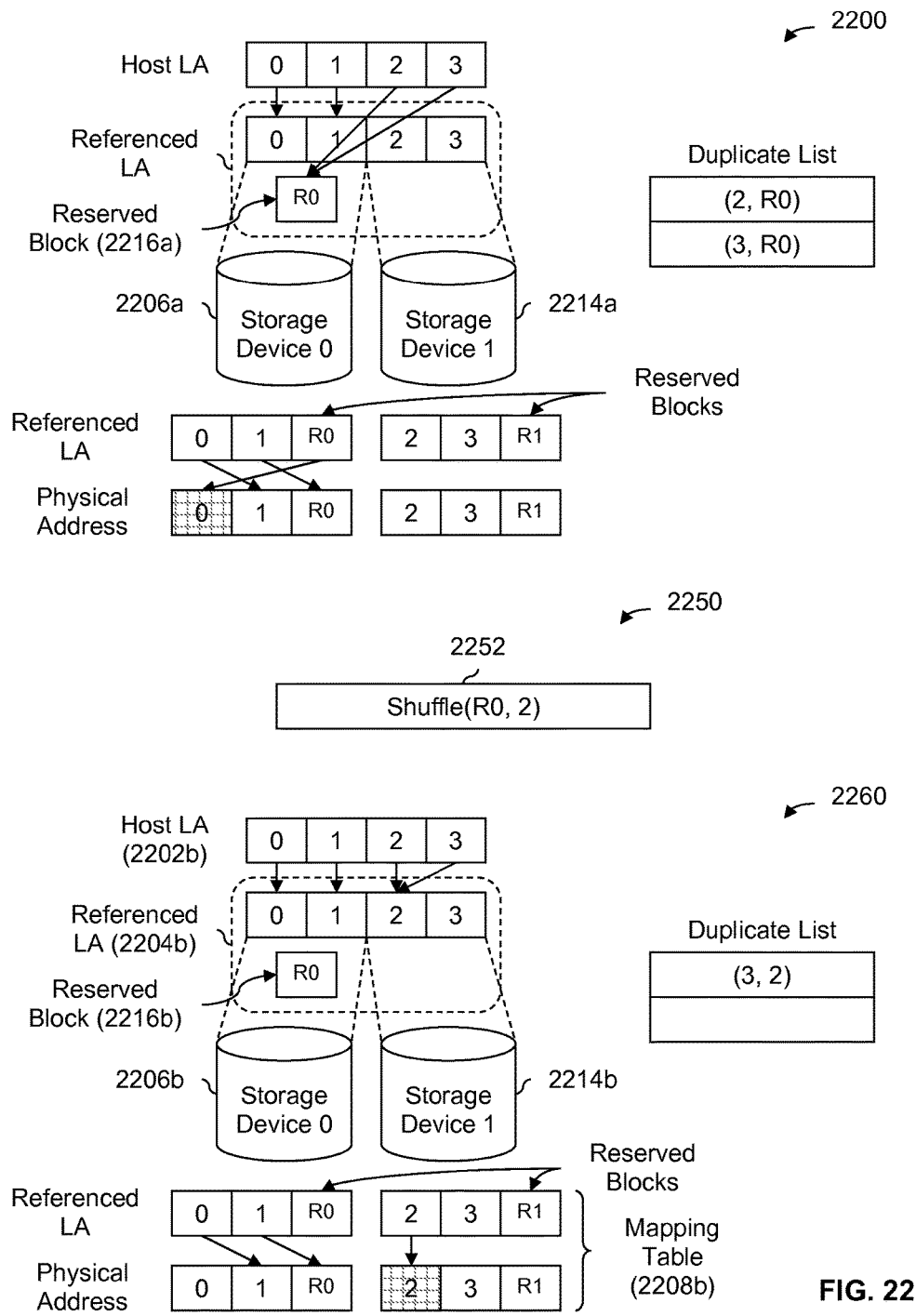
FIG. 22 is a diagram illustrating an embodiment of an optional shuffle instruction.

FIG. 22 is a diagram illustrating an embodiment of an optional shuffle instruction. In diagram 2200, storage device 2206a has used up all of its reserved blocks. In this example, each storage device only has a single logical and single physical reserved block. (It is noted that this figure is merely exemplary and any number of reserved blocks may be used.) To free up reserved block 2216a in diagram 2200, shuffle instruction 2252 in diagram 2250 is sent from a storage array controller to storage device 2206a. The shuffle instruction includes the (referenced) logical address of the reserved block being freed up (in this example, R0 on storage device 2206a) and the (referenced) logical address to which the data should now be associated with (in this example, referenced logical address 2 on storage device 2214a).

Diagram 2260 shows the state of the system after shuffle instruction 2252 has been processed by the system. The data previously located at physical address 0 on storage device 2206a has been moved to physical address 2 on storage device 2214b. The corresponding fingerprint (not shown) has also been moved from storage device 2206a to 2214b. To ensure that host logical addresses 2 and 3 are still associated with that data that has been moved, host logical addresses 2 and 3 in group 2202b point to referenced logical address 2 in group 2204b. In mapping table 2208b (associated with storage device 2214b), referenced logical address 2 points to physical address 2. All of this frees up reserved block 2216b.

As described above, in some embodiments a shuffle instruction is sent to a storage device when that storage device is almost, but not quite full. For example, when utilization of the reserved blocks has reached 80% or 90%, the storage array controller may send a shuffle instruction to that storage device. Since the storage array controller needs to store the logical addresses of the reserved blocks in the duplicate list (so that a read can be properly performed for reserved block data), the storage array controller can determine what percentage of a given storage device's reserved blocks are in use by scanning the reserved list.

The following figure illustrates an example where no storage device write instruction is generated because the write can be accomplished by updating the duplicate list.

Figure 23:
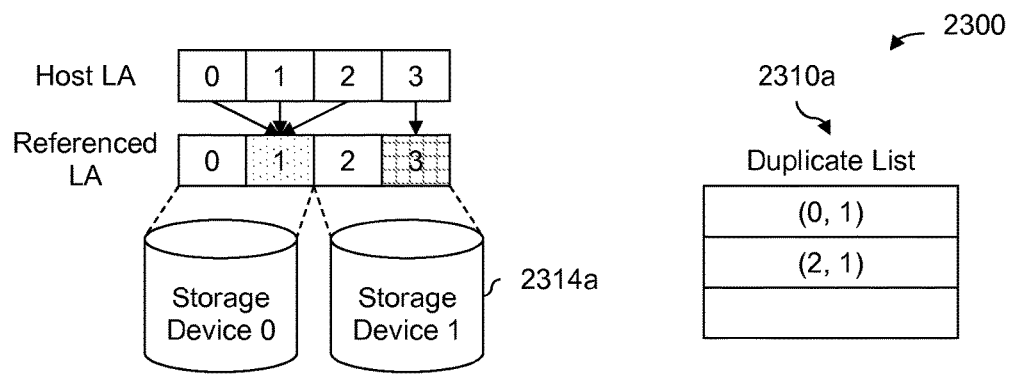
FIG. 23 is a diagram illustrating an embodiment where duplicate data is detected.
Figure 23:
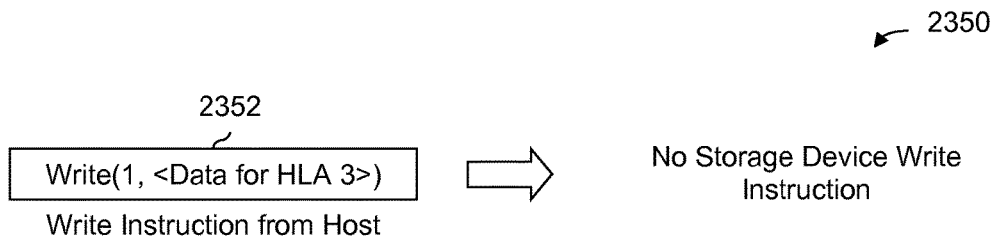
Figure 23:
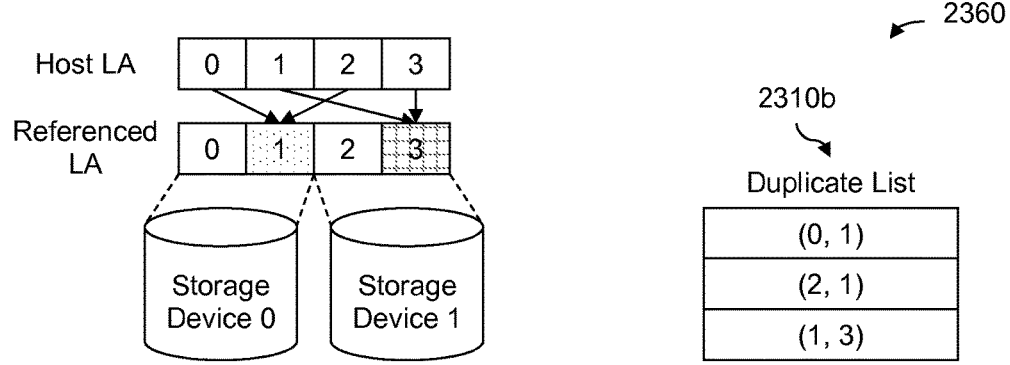

FIG. 23 is a diagram illustrating an embodiment where duplicate data is detected. As described above, one or more queries are sent to the storage devices in order to determine that the write data in write instruction 2352 has already been stored on the system.

Diagram 2300 shows the state of the system before the write instruction is received from the host. Diagram 2350 shows the write instruction that is received from the host (2352). In this example, the data in write instruction 2352 is associated with host logical address 3. As is shown in diagram 2300, that data is already stored at physical address 3 by storage device 2314a.

Since the write data is already stored, the write can be performed by updating the duplicate list 2310a so that host logical address 1 (i.e., the write logical address in write instruction 2352) references or otherwise points to the referenced logical address associated with data for host logical address 3. It is therefore not necessary to generate and send to the storage device a storage device write instruction, which is desirable since updating or otherwise modifying a duplicate list is faster than any operation performed by a storage device.

Diagram 2360 shows the state of the system after the storage array controller has modified the duplicate list in response to write instruction 2352. As is shown in diagram 2360, host logical address 1 (i.e., the write logical address) now points to referenced logical address 3 (i.e., the referenced logical address associated with the write data).

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A storage system, comprising:
a plurality of storage devices; and
a storage array controller coupled with the plurality of storage devices and configured to:
receive a write instruction that includes a write logical address and write data to be written to one of the plurality of storage devices;
generate a fingerprint from the write data;
send a query including the fingerprint to each of the plurality of storage devices through one or more communication channels, wherein the query asks each of the plurality of storage devices if the fingerprint is stored thereon;
receive a response to the query from each of the plurality of storage devices on which the fingerprint is stored; and
in an event it is determined that the responses indicate that the fingerprint is not stored on any of the plurality of storage devices, and the write logical address is not included in a duplicated list, send a storage device write instruction to a storage device, of the plurality of storage devices, corresponding to the write logical address;
in an event it is determined that none of the plurality of storage devices sends a response indicating that the fingerprint is stored thereon, the storage array controller is further configured to:
select a storage device, of the plurality of storage devices, that corresponds to the write logical address; and
determine if the write logical address is included in the duplicate list as a referenced logical address;
in an event it is determined that the write logical address is included in the duplicate list as a referenced logical address:
obtain an unused referenced logical address; and
send, to the selected storage device, a storage device write instruction that includes the write logical address, the write data, the fingerprint, and a remapping input that specifies the unused referenced logical address, wherein the remapping input, when processed by the selected storage device, causes the selected storage device to: (1) in a mapping table, map the unused referenced logical address to a physical address previously associated with the write logical address and (2) in the mapping table, map the write logical address to a physical address to which the write data is written; and
in an event it is determined that the write logical address is not included in the duplicate list as a referenced logical address, send, to the selected storage device, a storage device write instruction that includes the write logical address, the write data, and the fingerprint.

2. The storage system of claim 1, wherein the storage array controller includes a semiconductor device, including one or more of the following: an application-specific integrated circuit (ASIC) or a field-programmable gate array (FPGA).

3. The storage system of claim 1, wherein the query includes a broadcasted query and the one or more communication channels includes a shared communication channel.

4. The storage system of claim 1, wherein each of the plurality of storage devices is configured to:
   receive the query that includes the fingerprint;
   determine if the fingerprint is stored thereon;
   in an event it is determined that the fingerprint is stored thereon, send, to the storage array controller, a response that the fingerprint is stored thereon; and
   in an event it is determined that the fingerprint is not stored thereon, send, to the storage array controller, a response that the fingerprint is not stored thereon.

5. The storage system of claim 4, wherein the storage array controller is further configured to:
   wait until a response to the query is received from every one of the plurality of storage devices;
   determine if a storage device, of the plurality of storage devices, sends a response indicating that the fingerprint is stored thereon; and
   in an event it is determined that a storage device, of the plurality of storage devices, sends a response indicating that the fingerprint is stored thereon:
      obtain, from the response sent by that storage device, a referenced logical address; and
      create, in the duplicate list stored on the storage array controller, an association between the write logical address and the referenced logical address.

6. The storage system of claim 5, wherein in an event it is determined that none of the plurality of storage devices sends a response indicating that the fingerprint is stored thereon, the storage array controller is further configured to:
   select a storage device, of the plurality of storage devices, that corresponds to the write logical address;
   determine if the storage device that corresponds to the write logical address is full;
   in an event it is determined that the storage device that corresponds to the write logical address is full:
      send, to the full storage device, a storage device write instruction that includes the write logical address, the write data, the fingerprint, and a keep flag, wherein the keep flag, when processed by the full storage device, causes the full storage device to store new data on the full storage device using a reserved block having a logical address;
      receive, from the full storage device, the logical address of the reserved block; and
      store an association between the write logical address and the logical address of the reserved block; and
   in an event it is determined that the storage device that corresponds to the write logical address is not full,
      send, to the selected storage device, a storage device write instruction that includes the write logical address, the write data, and the fingerprint.

7. The storage system of claim 1, wherein each of the plurality of storage devices are configured to:
   receive the query that includes the fingerprint;
   determine if the fingerprint is stored thereon;
   in an event it is determined that the fingerprint is stored thereon, send, to the storage array controller, a response that the fingerprint is stored thereon; and
   in an event it is determined that the fingerprint is not stored thereon, send no response to the storage array controller.

8. The storage system of claim 7, wherein the storage array controller is further configured to:
   wait until a timeout expires;
   determine if at least one storage device, of the plurality of storage devices, sends a response indicating that the fingerprint is stored thereon; and
   in an event it is determined that at least one storage device sends a response indicating that the fingerprint is stored thereon:
      select one of the storage devices that has the fingerprint stored;
      obtain, from the response sent by the selected storage device, a referenced logical address; and
      create, in a duplicate list stored on the storage array controller, an association between the write logical address and the referenced logical address.

9. The storage system of claim 8, wherein in the event it is determined that none of the plurality of storage devices sends a response indicating that the fingerprint is stored thereon, the storage array controller is further configured to:
   select a storage device that corresponds to the write logical address;
   determine if the write logical address is included in the duplicate list as a referenced logical address;
   in an event it is determined that the write logical address is included in the duplicate list as a referenced logical address:
      obtain an unused referenced logical address; and
      send, to the selected storage device, a storage device write instruction that includes the write logical address, the write data, the fingerprint, and a remapping input that specifies the unused referenced logical address, wherein the remapping input, when processed by the selected storage device, causes the selected storage device to: (1) in a mapping table, map the unused referenced logical address to a physical address previously associated with the write logical address and (2) in the mapping table, map the write logical address to a physical address to which the write data is written; and
   in an event it is determined that the write logical address is not included in the duplicate list as a referenced logical address, send, to the selected storage device, a storage device write instruction that includes the write logical address, the write data, and the fingerprint.

10. The storage system of claim 8, wherein in the event it is determined that none of the plurality of storage devices sends a response indicating that the fingerprint is stored thereon, the storage array controller is further configured to:
   select a storage device that corresponds to the write logical address;
   determine if the storage device that corresponds to the write logical address is full;
   in an event it is determined that the storage device that corresponds to the write logical address is full:
      send, to the full storage device, a storage device write instruction that includes the write logical address, the write data, the fingerprint, and a keep flag, wherein the keep flag, when processed by the full storage device, causes the full storage device to store new data on the full storage device using a reserved block having a logical address;
      receive, from the full storage device, the logical address of the reserved block; and
      store an association between the write logical address and the logical address of the reserved block; and in an event it is determined that the storage device that corresponds to the write logical address is not full, send, to the selected storage device, a storage device write instruction that includes the write logical address, the write data, and the fingerprint.

11. A method of operating a storage system, comprising:
receiving, at a storage array controller, a write instruction that includes a write logical address and write data to be written to one of a plurality of storage devices;
using the storage array controller to generate a fingerprint from the write data;
sending a query including the fingerprint, from the storage array controller to each of the plurality of storage devices through one or more communication channels, wherein the query asks each of the plurality of storage devices if the fingerprint is stored thereon;
receiving, by the storage array controller, a response to the query from each of the plurality of storage devices on which the fingerprint is stored; and
in an event it is determined that the response indicates that the fingerprint is not stored on any of the plurality of storage devices, and when the write logical address is not included in a duplicated list, sending a storage device write instruction to a storage device, of the plurality of storage devices, corresponding to the write logical address;
in an event it is determined that none of the plurality of storage devices sends a response indicating that the fingerprint is stored thereon:
  selecting, at the storage array controller, a storage device that corresponds to the write logical address; and
  determining, at the storage array controller, if the write logical address is included in the duplicate list as a referenced logical address;
in an event it is determined that the write logical address is included in the duplicate list as a referenced logical address:
  obtaining, at the storage array controller, an unused referenced logical address; and
  sending, from the storage array controller to the selected storage device, a storage device write instruction that includes the write logical address, the write data, the fingerprint, and a remapping input that specifies the unused referenced logical address, wherein the remapping input, when processed by the selected storage device, causes the selected storage device to: (1) in a mapping table, map the unused referenced logical address to a physical address previously associated with the write logical address and (2) in the mapping table, map the write logical address to a physical address to which the write data is written; and
in an event it is determined that the write logical address is not included in the duplicate list as a referenced logical address, sending, from the storage array controller to the selected storage device, a storage device write instruction that includes the write logical address, the write data, and the fingerprint.

12. The method of claim 11, wherein the using storage array controller includes using a semiconductor device including one or more of the following: an application-specific integrated circuit (ASIC) or a field-programmable gate array (FPGA).

13. The method of claim 11, wherein the sending a query through one or more communication channels includes sending a broadcasted query through a shared communication channel.

14. The method of claim 11, further comprising:
receiving, by each of the plurality of storage devices, the query that includes the fingerprint;
determining, at each of the plurality of storage devices, if the fingerprint is stored thereon;
in an event it is determined that the fingerprint is stored on one or more of the plurality of storage devices, sending to the storage array controller, from each storage device on which it determined stores the fingerprint, a response that the fingerprint is stored thereon; and
in an event it is determined that the fingerprint is not stored on any of the plurality of storage devices, sending, from each of the plurality of storage devices to the storage array controller, a response that the fingerprint is not stored thereon.

15. The method of claim 14, further comprising:
having the storage array controller wait until a response to the query is received from every one of the plurality of storage devices;
determining, at the storage array controller, if a storage device, of the plurality of storage devices, sends a response indicating that the fingerprint is stored thereon; and
in an event it is determined that a storage device sends a response indicating that the fingerprint is stored thereon:
  obtaining, at the storage array controller, a referenced logical address from the response sent by the storage device; and
  create, in the duplicate list stored on the storage array controller, an association between the write logical address and the referenced logical address.

16. The method of claim 15, further comprising: in the event it is determined that none of the plurality of storage devices sends a response indicating that the fingerprint is stored thereon:
selecting, at the storage array controller, a storage device that corresponds to the write logical address;
determining, at the storage array controller, if the storage device that corresponds to the write logical address is full;
in an event it is determined that the storage device that corresponds to the write logical address is full:
  sending, from the storage array controller to the full storage device, a storage device write instruction that includes the write logical address, the write data, the fingerprint, and a keep flag, wherein the keep flag, when processed by the full storage device, causes the full storage device to store new data on the full storage device using a reserved block having a logical address;
  receiving, at the storage array controller from the full storage device, the logical address of the reserved block; and
  storing, at the storage array controller, an association between the write logical address and the logical address of the reserved block; and
in an event it is determined that the storage device that corresponds to the write logical address is not full, sending, from the storage array controller to the selected storage device, a storage device write instruction that includes the write logical address, the write data, and the fingerprint.

17. The method of claim 11, further comprising at each of the plurality of storage devices:
  receiving the query that includes the fingerprint;
  determining if the fingerprint is stored thereon;
  in an event it is determined that the fingerprint is stored thereon, sending, to the storage array controller, a response that the fingerprint is stored thereon; and
  in an event it is determined that the fingerprint is not stored thereon, sending no response to the storage array controller.

18. The method of claim 17, further comprising:
  having the storage array controller wait until a timeout expires;
  determining, at the storage array controller, if at least one storage device, of the plurality of storage devices, sends a response indicating that the fingerprint is stored thereon; and
  in an event it is determined that at least one storage device sends a response indicating that the fingerprint is stored thereon:
    selecting, at the storage array controller, one of the storage devices that has the fingerprint stored;
    obtaining, at the storage array controller and from the response sent by the selected storage device, a referenced logical address; and
    creating, in a duplicate list stored on the storage array controller, an association between the write logical address and the referenced logical address.

19. The method of claim 18, further comprising: in the event it is determined that none of the plurality of storage devices sends a response indicating that the fingerprint is stored thereon:
  selecting, at the storage array controller, a storage device that corresponds to the write logical address;
  determining, at the storage array controller, if the write logical address is included in the duplicate list as a referenced logical address;
  in an event it is determined that the write logical address is included in the duplicate list as a referenced logical address:
    obtaining, at the storage array controller, an unused referenced logical address; and
    sending, from the storage array controller to the selected storage device, a storage device write instruction that includes the write logical address, the write data, the fingerprint, and a remapping input that specifies the unused referenced logical address, wherein the remapping input, when processed by the selected storage device, causes the selected storage device to: (1) in a mapping table, map the unused referenced logical address to a physical address previously associated with the write logical address and (2) in the mapping table, map the write logical address to a physical address to which the write data is written; and
  in an event it is determined that the write logical address is not included in the duplicate list as a referenced logical address, sending, from the storage array controller to the selected storage device, a storage device write instruction that includes the write logical address, the write data, and the fingerprint.

20. The method of claim 18, further comprising in an event it is determined that none of the plurality of storage devices sends a response indicating that the fingerprint is stored thereon:
  selecting, at the storage array controller, a storage device that corresponds to the write logical address;
  determining, at the storage array controller, if the storage device that corresponds to the write logical address is full;
  in an event it is determined that the storage device that corresponds to the write logical address is full:
    sending, from the storage array controller to the full storage device, a storage device write instruction that includes the write logical address, the write data, the fingerprint, and a keep flag, wherein the keep flag, when processed by the full storage device, causes the full storage device to store new data on the full storage device using a reserved block having a logical address;
    receiving, at the storage array controller and from the full storage device, the logical address of the reserved block; and
    storing an association between the write logical address and the logical address of the reserved block; and
  in an event it is determined that the storage device that corresponds to the write logical address is not full, sending, from the storage array controller to the selected storage device, a storage device write instruction that includes the write logical address, the write data, and the fingerprint.

21. A computer program product, the computer program product being embodied in a non-transitory computer readable storage medium and comprising computer instructions for:
  receiving, at a storage array controller, a write instruction that includes a write logical address and write data to be written to one of a plurality of storage devices;
  using the storage array controller to generate a fingerprint from the write data;
  sending a query including the fingerprint, from the storage array controller to each of the plurality of storage devices through one or more communication channels, wherein the query asks each of the plurality of storage devices if the fingerprint is stored thereon;
  receiving a response to the query by the storage array controller from each of the plurality of storage devices on which the fingerprint is stored; and
  in an event it is determined that the responses indicate that the fingerprint is not stored on any of the plurality of storage devices, and when the write logical address is not included in a duplicated list, sending a storage device write instruction to a storage device, of the plurality of storage devices, corresponding to the write logical address;
  in an event it is determined that none of the plurality of storage devices sends a response indicating that the fingerprint is stored thereon:
    selecting, at the storage array controller, a storage device that corresponds to the write logical address; and
    determining, at the storage array controller, if the write logical address is included in the duplicate list as a referenced logical address;
  in an event it is determined that the write logical address is included in the duplicate list as a referenced logical address:
    obtaining, at the storage array controller, an unused referenced logical address; and
    sending, from the storage array controller to the selected storage device, a storage device write instruction that includes the write logical address, the write data, the fingerprint, and a remapping input that specifies the unused referenced logical address, wherein the remapping input, when processed by the selected storage device, causes the selected storage device to: (1) in a mapping table, map the unused referenced logical address to a physical address previously associated with the write logical address and (2) in the mapping table, map the write logical address to a physical address to which the write data is written; and in an event it is determined that the write logical address is not included in the duplicate list as a referenced logical address, sending, from the storage array controller to the selected storage device, a storage device write instruction that includes the write logical address, the write data, and the fingerprint.

\* \* \* \* \*